(12) United States Patent
Asano et al.

(10) Patent No.: US 9,331,344 B2
(45) Date of Patent: May 3, 2016

(54) FUEL CELL

(71) Applicant: Honda Motor Co., Ltd., Tokyo (JP)

(72) Inventors: Yuji Asano, Utsunomiya (JP); Shuji Sato, Utsunomiya (JP); Kenji Nagumo, Tokyo (JP); Kentaro Ishida, Utsunomiya (JP); Naoki Yamano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 14/538,363

(22) Filed: Nov. 11, 2014

(65) Prior Publication Data

US 2015/0132680 A1    May 14, 2015

(30) Foreign Application Priority Data

Nov. 11, 2013  (JP) ................. 2013-233368
Oct. 23, 2014  (JP) ................. 2014-216145

(51) Int. Cl.
   *H01M 2/18*    (2006.01)
   *H01M 8/02*    (2006.01)
   *H01M 8/10*    (2016.01)
   *H01M 8/24*    (2016.01)

(52) U.S. Cl.
   CPC .......... *H01M 8/0265* (2013.01); *H01M 8/0263* (2013.01); *H01M 8/026* (2013.01); *H01M 8/0267* (2013.01); *H01M 8/0273* (2013.01); *H01M 8/242* (2013.01); *H01M 2008/1095* (2013.01); *Y02E 60/50* (2013.01)

(58) Field of Classification Search
   None
   See application file for complete search history.

(56) References Cited

U.S. PATENT DOCUMENTS

2012/1315556    *   12/2012   Darling ................. H01M 8/06

FOREIGN PATENT DOCUMENTS

JP          2013-98155          5/2013

* cited by examiner

*Primary Examiner* — Cynthia K Walls
(74) *Attorney, Agent, or Firm* — Nelson Mullins Riley & Scarborough LLP; Anthony A. Laurentano

(57) ABSTRACT

A power generation unit of a fuel cell stack includes a first metal separator, a first membrane electrode assembly, a second metal separator, a second membrane electrode assembly, and a third metal separator. A first oxygen-containing gas flow field includes a plurality of wavy flow grooves. An outlet merging area is provided at the end of the wavy flow grooves on the outlet side. The outlet merging area is connected to a plurality of straight connection flow grooves. The groove depth of the straight connection flow grooves is smaller than the groove depth of the wavy flow grooves.

4 Claims, 22 Drawing Sheets

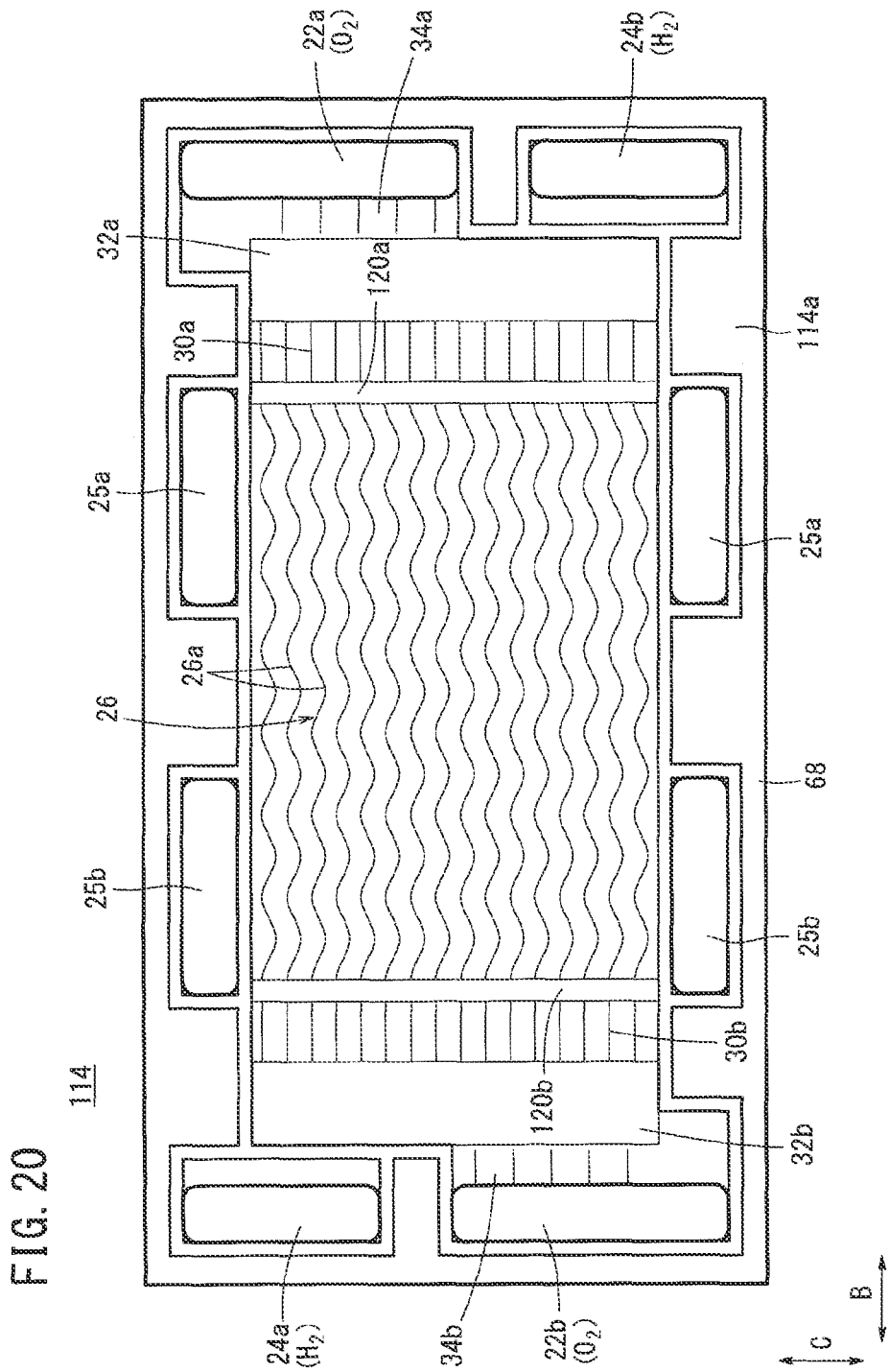

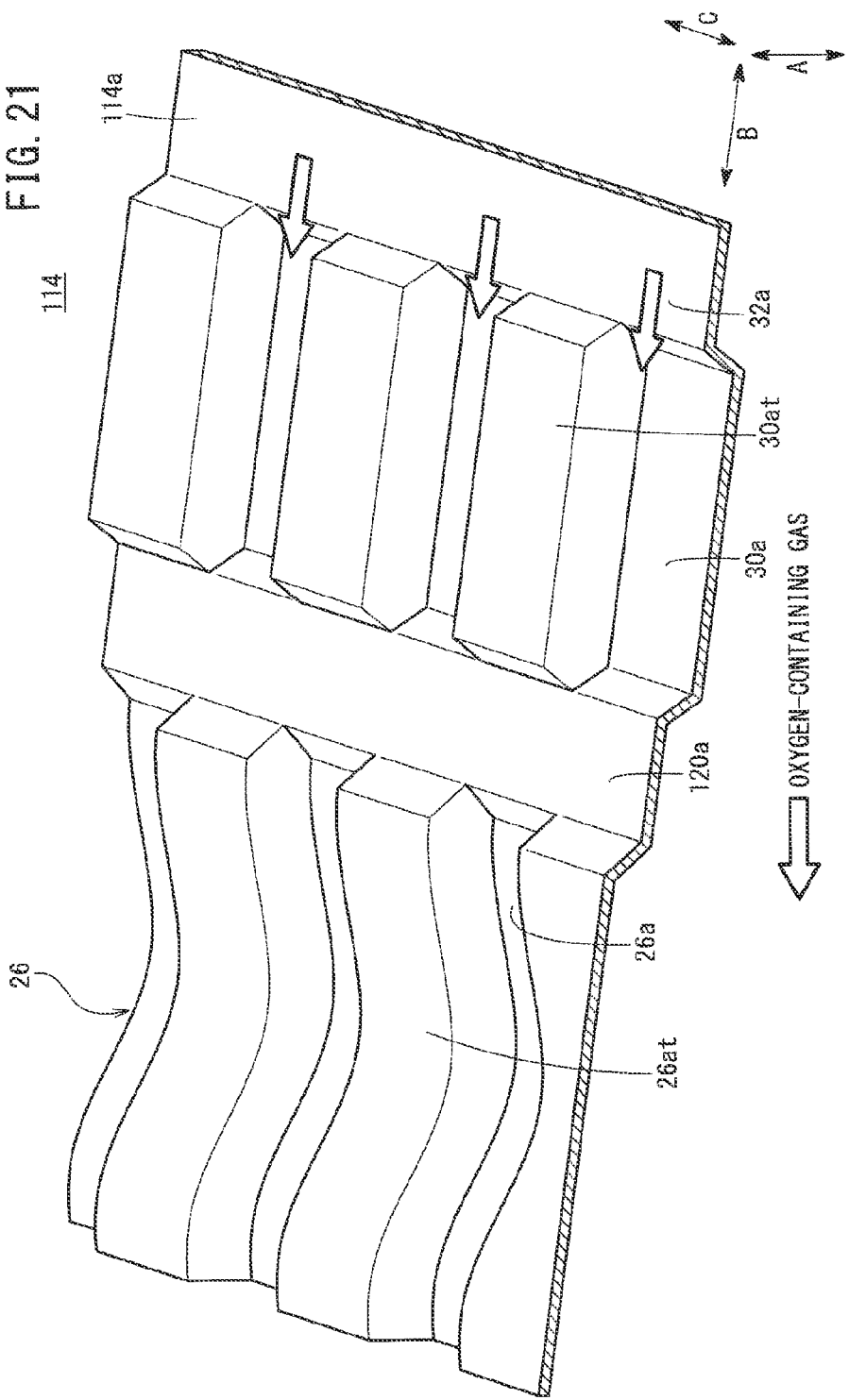

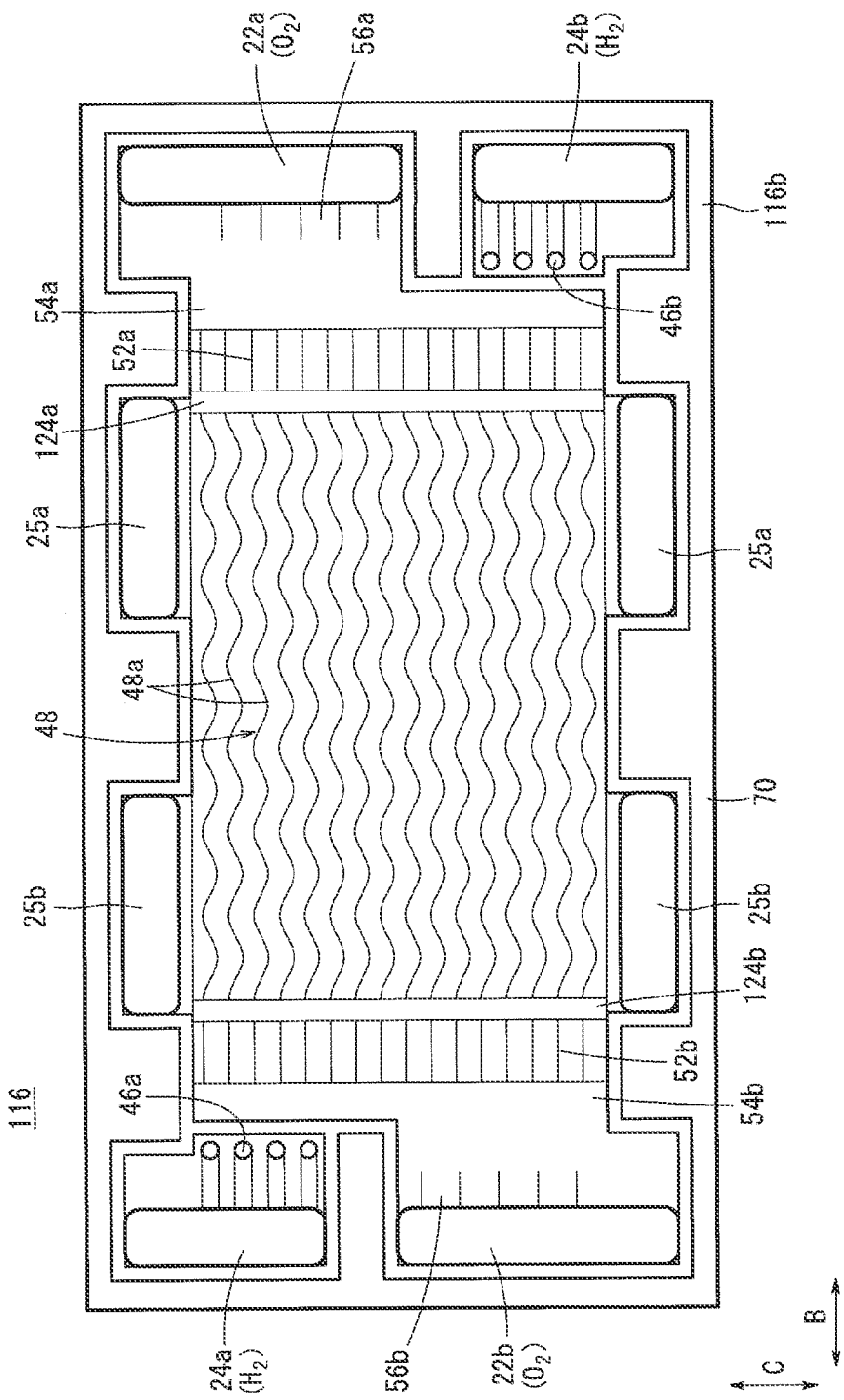

FUEL CELL

CROSS-REFERENCE TO RELATED APPLICATIONS

This application is based upon and claims the benefit of priority from Japanese Patent Applications No. 2013-233368filed on Nov. 11, 2013 and No. 2014-216145 filed on Oct. 23, 2014, the contents all of which are incorporated herein by reference.

BACKGROUND OF THE INVENTION

1. Field of the Invention

The present invention relates to a fuel cell formed by stacking a membrane electrode assembly and separators together. The membrane electrode assembly includes a pair of electrodes and an electrolyte membrane interposed between the electrodes.

2. Description of the Related Art

For example, a solid polymer electrolyte fuel cell employs a membrane electrode assembly (MEA) which includes a solid polymer electrolyte membrane, an anode provided on one side of the solid polymer electrolyte membrane, and a cathode provided on the other side of the solid polymer electrolyte membrane. The solid electrolyte membrane is a polymer ion exchange membrane. The membrane electrode assembly is sandwiched between separators to form a power generation cell (unit cell). Generally, several tens to hundreds of power generation cells are stacked together to from a fuel cell stack, e.g., for use in a vehicle.

In some cases, the membrane electrode assembly is an MEA having different sizes of components where a gas diffusion layer of one of the electrodes has a plane size which is smaller than that of the solid polymer electrolyte membrane, and a gas diffusion layer of the other of electrodes has the same plane size as that of the solid polymer electrolyte membrane.

Normally, in the fuel cell stack, a large number of membrane electrode assemblies are stacked together. In order to reduce to the production cost, it is desired to adopt inexpensive structure of the membrane electrode assembly. Therefore, in particular, various proposals have been made for reducing the used amount of the solid polymer electrolyte membrane, and simplifying the structure.

For example, a fuel cell stack disclosed in Japanese Laid-Open Patent Publication No. 2013-098155 has a membrane electrode assembly including a solid polymer electrolyte membrane and a first electrode and a second electrode provided on both sides of the solid polymer electrolyte membrane. Each of the first electrode and the second electrode has an electrode catalyst layer and a gas diffusion layer. The outer size of the first electrode is smaller than the outer size of the second electrode. A resin frame member is provided around the solid polymer electrolyte membrane.

SUMMARY OF THE INVENTION

The above resin frame member is relatively thick to have sufficient rigidity. For this purpose, the groove depth of reactant gas flow fields formed between the separators and the membrane electrode assembly tends to be small in areas facing the resin frame member. In the areas having the small groove depth, water may not be discharged smoothly due to capillary phenomenon. Consequently, the desired amounts of reactant gases cannot be supplied to reactant gas flow fields, and the power generation performance is poor.

The present invention has been made to solve the problem of this type, and an object of the present invention is to provide a fuel cell which is capable of improving the performance of discharging the water produced in the power generation with simple and economical structure.

A fuel cell according to the present invention is formed by stacking a membrane electrode assembly and separators together in a stacking direction. The membrane electrode assembly includes a pair of electrodes and an electrolyte membrane between the electrodes. A first reactant gas flow field is formed in the separator facing one of the electrodes and configured to supply one of reactant gases along an electrode surface. A second reactant gas flow field is formed in the separator facing another of the electrodes and configured to supply another of reactant gases along an electrode surface.

Further, at least the first reactant gas flow field includes, a plurality of flow grooves formed between a plurality of ridges extending along a power generation area in parallel to one another. At an end of the flow field, flows in a plurality of flow grooves are merged in a flow field width direction, in the merging area by reducing the height of the ridges. The merging area has one end connected to the flow grooves, and connection flow grooves are connected to another end of the merging area opposite to the one end of the merging area. The groove depth of the connection flow grooves is smaller than the groove depth of the flow grooves of the flow field.

In the present invention, the merging area is provided in an area where the groove depth (flow field height) is decreased from the flow grooves of the flow field to the connection flow grooves. In the structure, after flows of the reactant gas from the flow grooves are merged in the merging area, the reactant gas flows through each of the connection flow grooves. Accordingly, improvement in the flowability of the oxygen-containing gas is achieved. With simple and economical structure, improvement in the performance of distributing the gas to the flow grooves is achieved. Moreover, improvement in the performance of discharging the water produced in the power generation is achieved suitably. It becomes possible to maintain the desired power generation performance.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 20 is a front view showing a first metal separator of the power generation unit;

FIG. 21 is an enlarged perspective view showing main components of the first metal separator; and FIG. 22 is a front view showing a second metal separator of the power generation unit.

DESCRIPTION OF THE PREFERRED EMBODIMENTS

Figure 1:
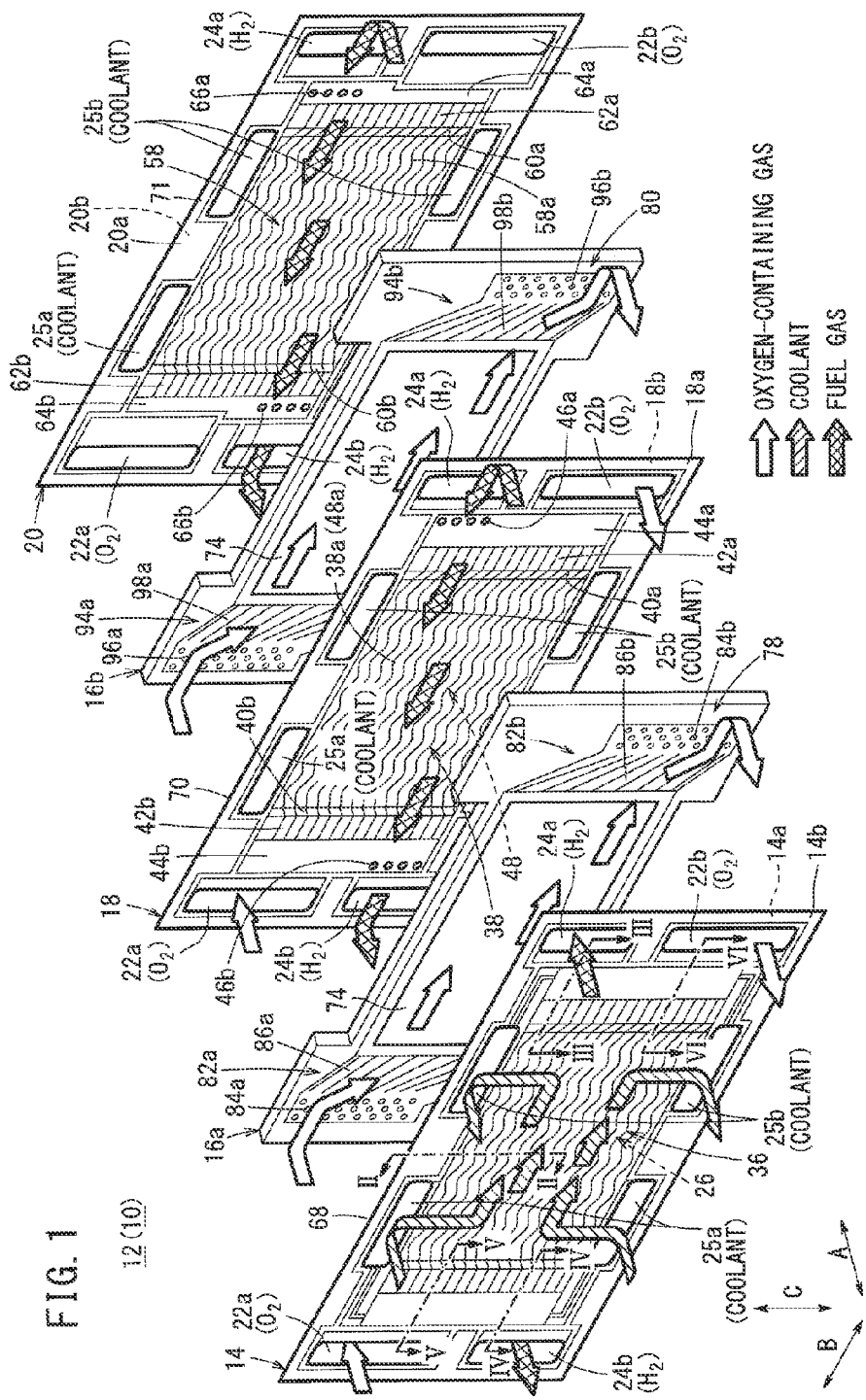
FIG. 1 is an exploded perspective view showing main components of a power generation unit of a fuel cell according to a first embodiment of the present invention.

As shown in FIGS. 1 to 6, a fuel cell stack 10 (fuel cell) according to a first embodiment of the present invention includes a power generation unit 12. A plurality of the power generation units 12 are stacked together in a horizontal direction indicated by an arrow A or in a vertical direction indicated by an arrow C. Each of the power generation units 12 includes a first metal separator 14, a first membrane electrode assembly (MEA) 16a, a second metal separator 18, a second membrane electrode assembly (MEA) 16b, and a third metal separator 20.

For example, the first metal separator 14, the second metal separator 18, and the third metal separator 20 are laterally elongated metal plates such as steel plates, stainless steel plates, aluminum plates, plated steel sheets, or metal plates having anti-corrosive surfaces by surface treatment. The first metal separator 14, the second metal separator 18, and the third metal separator 20 have rectangular planar surfaces, and are formed by corrugating metal thin plates by press forming to have a corrugated shape in cross section and a wavy or serpentine shape on the surface.

As shown in FIG. 1, at one end of the power generation unit 12 in a long-side direction indicated by an arrow B, an oxygen-containing gas supply passage 22a and a fuel gas discharge passage 24b are provided. The oxygen-containing gas supply passage 22a and the fuel gas discharge passage 24b extend through the power generation unit 12 in the direction indicated by the arrow A. Specifically, at one end of the first metal separator 14, the second metal separator 18, and the third metal separator 20 in the long-side direction, the oxygen-containing gas supply passage 22a and the fuel gas discharge passage 24b are provided. An oxygen-containing gas is supplied through the oxygen-containing gas supply passage 22a, and a fuel gas such as a hydrogen-containing gas is discharged through the fuel gas discharge passage 24b.

At the other end of the power generation unit 12 in the long-side direction indicated by the arrow B, a fuel gas supply passage 24a for supplying the fuel gas and an oxygen-containing gas discharge passage 22b for discharging the oxygen-containing gas are provided. The fuel gas supply passage 24a and the oxygen-containing gas discharge passage 22b extend through the power generation unit 12 in the direction indicated by the arrow A.

At both ends of the power generation unit 12 in a short-side direction indicated by the arrow C, a pair of coolant supply passages 25a for supplying a coolant are provided adjacent to the oxygen-containing gas supply passage 22a. The coolant supply passages 25a extend through the power generation unit 12 in the direction indicated by the arrow A. Further, at both ends of the power generation unit 12 in the short-side direction indicated by the arrow C, a pair of coolant discharge passages 25b for discharging the coolant are provided adjacent to the fuel gas supply passage 24a. The coolant discharge passages 25b extend through the power generation unit 12 in the direction indicated by the arrow A.

Figure 7:
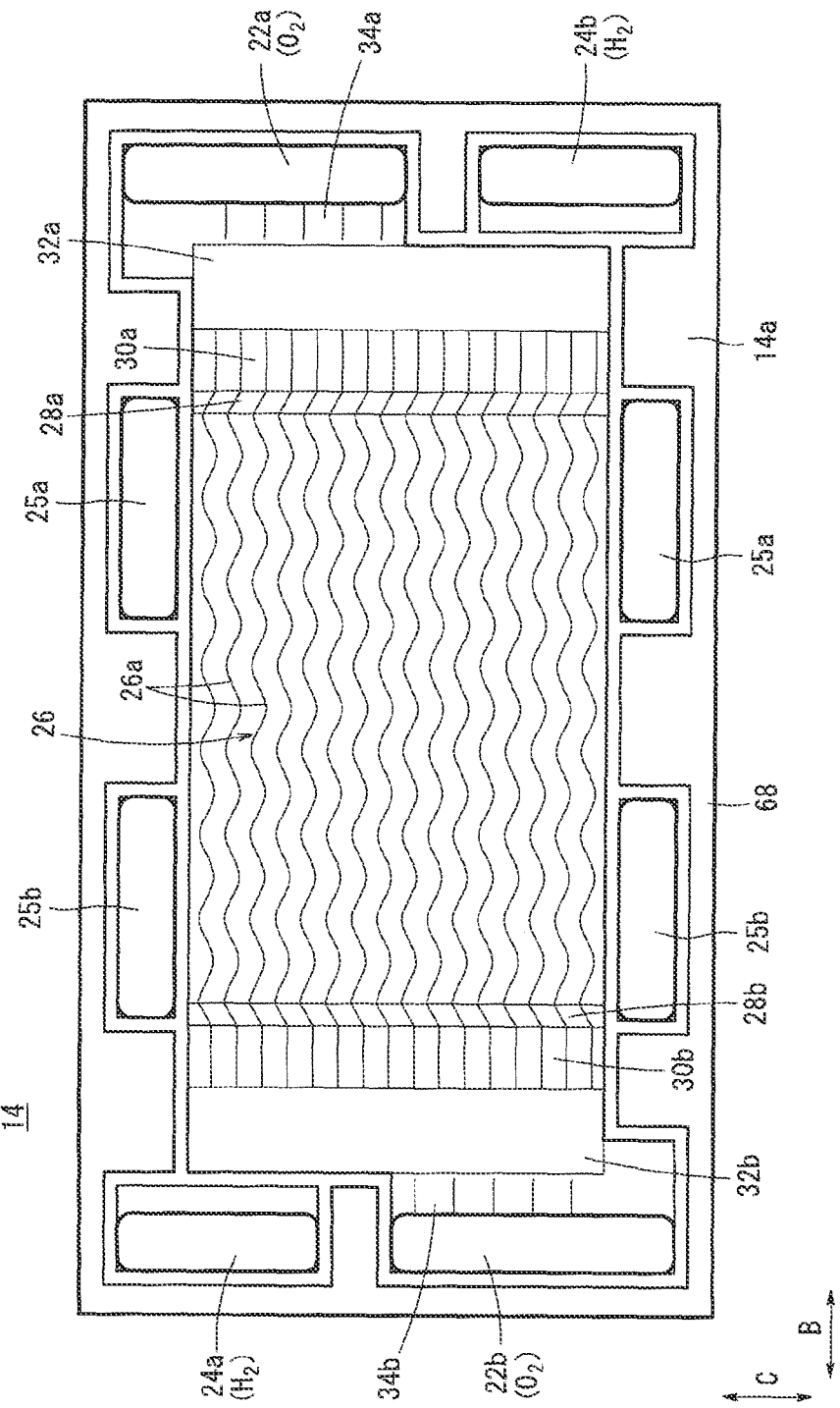
FIG. 7 is a front view showing a first metal separator of the power generation unit.

As shown in FIG. 7, the first metal separator 14 has a first oxygen-containing gas flow field 26 on its surface 14a facing the first membrane electrode assembly 16a. The first oxygen-containing gas flow field 26 is connected to the oxygen-containing gas supply passage 22a and the oxygen-containing gas discharge passage 22b.

The first oxygen-containing gas flow field 26 includes a plurality of wavy flow grooves (or straight flow grooves) 26a extending in the direction indicated by the arrow B. The wavy flow grooves 26a may extend in a zigzag pattern including straight segments, instead of the curved wavy pattern including curved segments. In the case of adopting grooves in the zigzag pattern, the grooves may include rounded segments at corners of the zigzag pattern. An inlet merging area 28a is provided at an end of the first oxygen-containing gas flow field 26 on the oxygen-containing gas inlet side, and an outlet merging area 28b is provided at the other end of the first oxygen-containing gas flow field 26 on the oxygen-containing gas outlet side.

Figure 5:
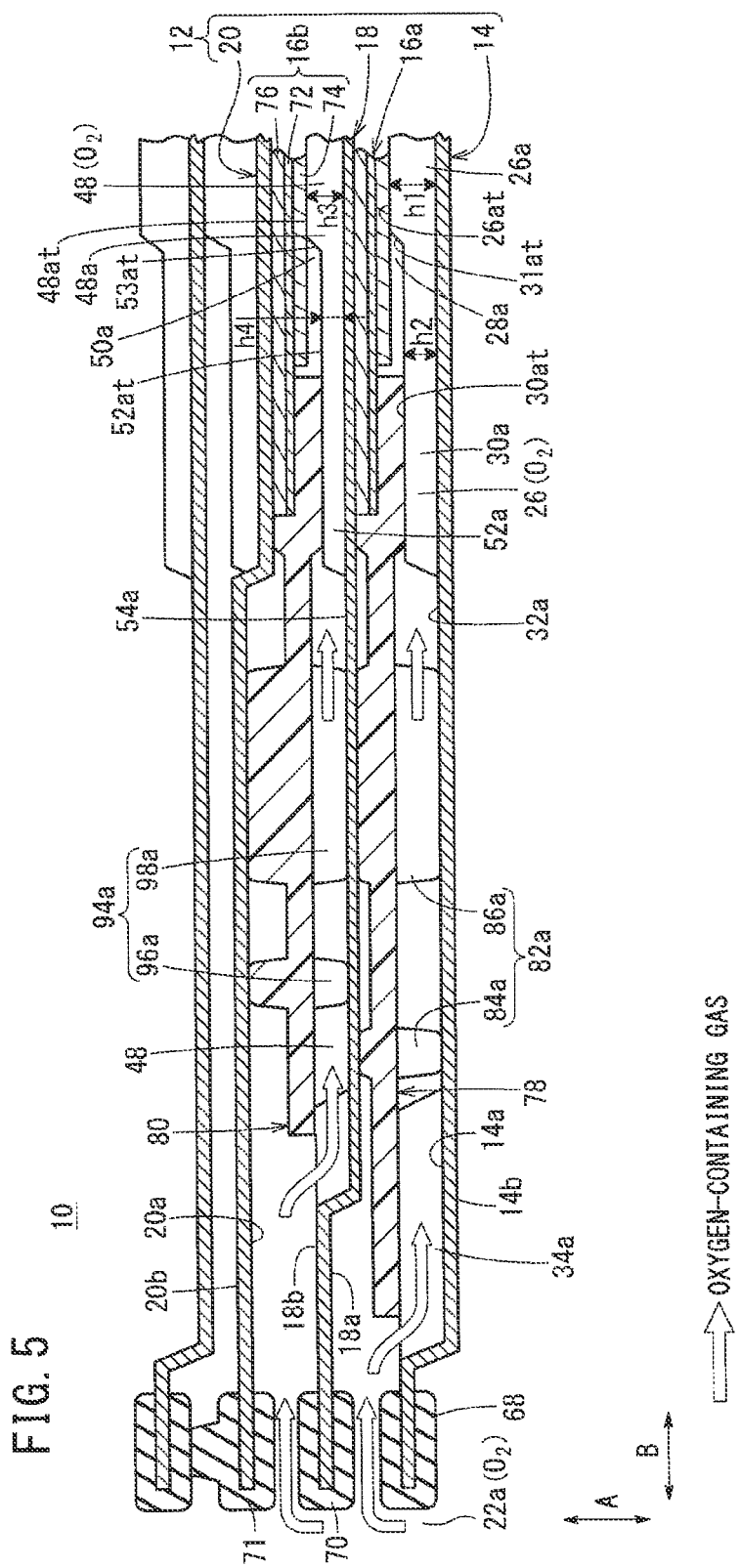
FIG. 5 is a cross sectional view showing the power generation unit, taken along a line V-V in FIG. 1.
Figure 6:
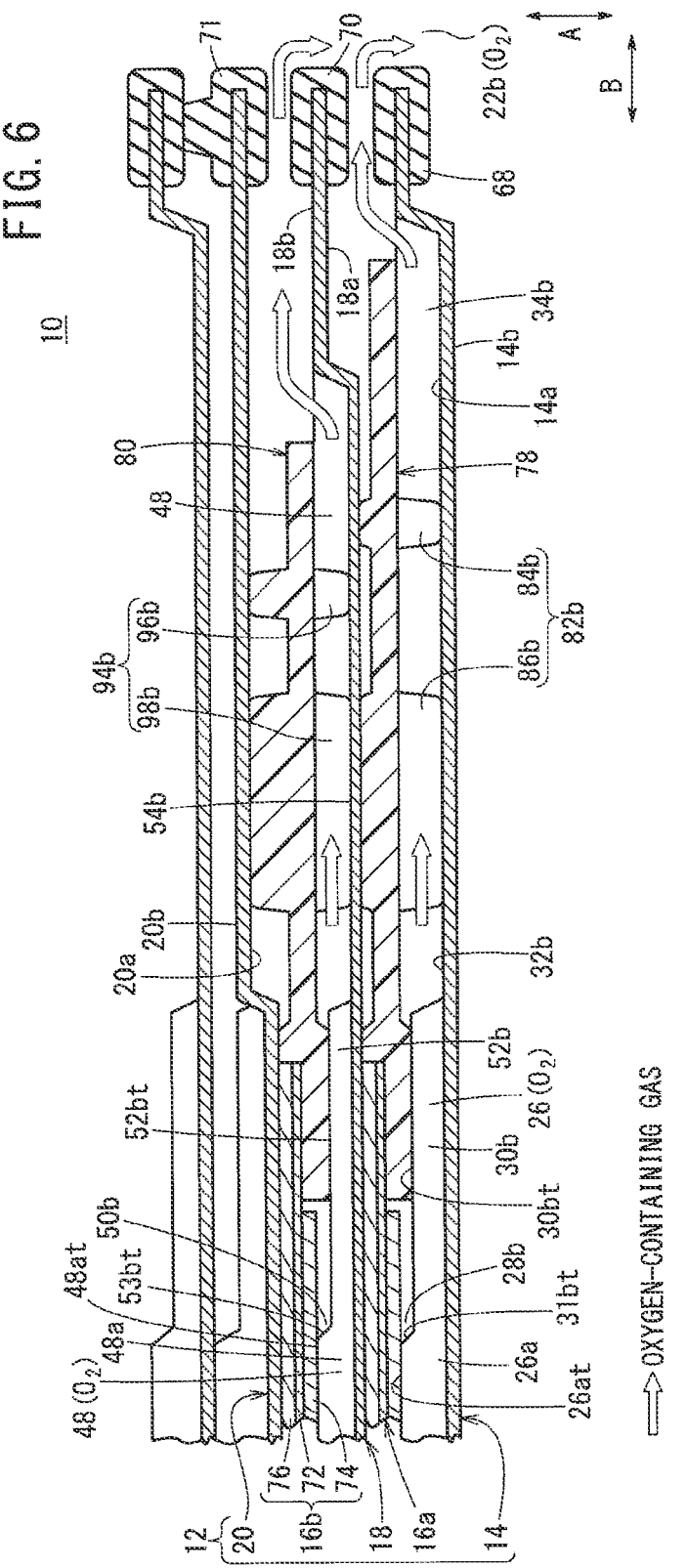
FIG. 6 is a cross sectional view showing the power generation unit, taken along a line VI-VI in FIG. 1.
Figure 8:
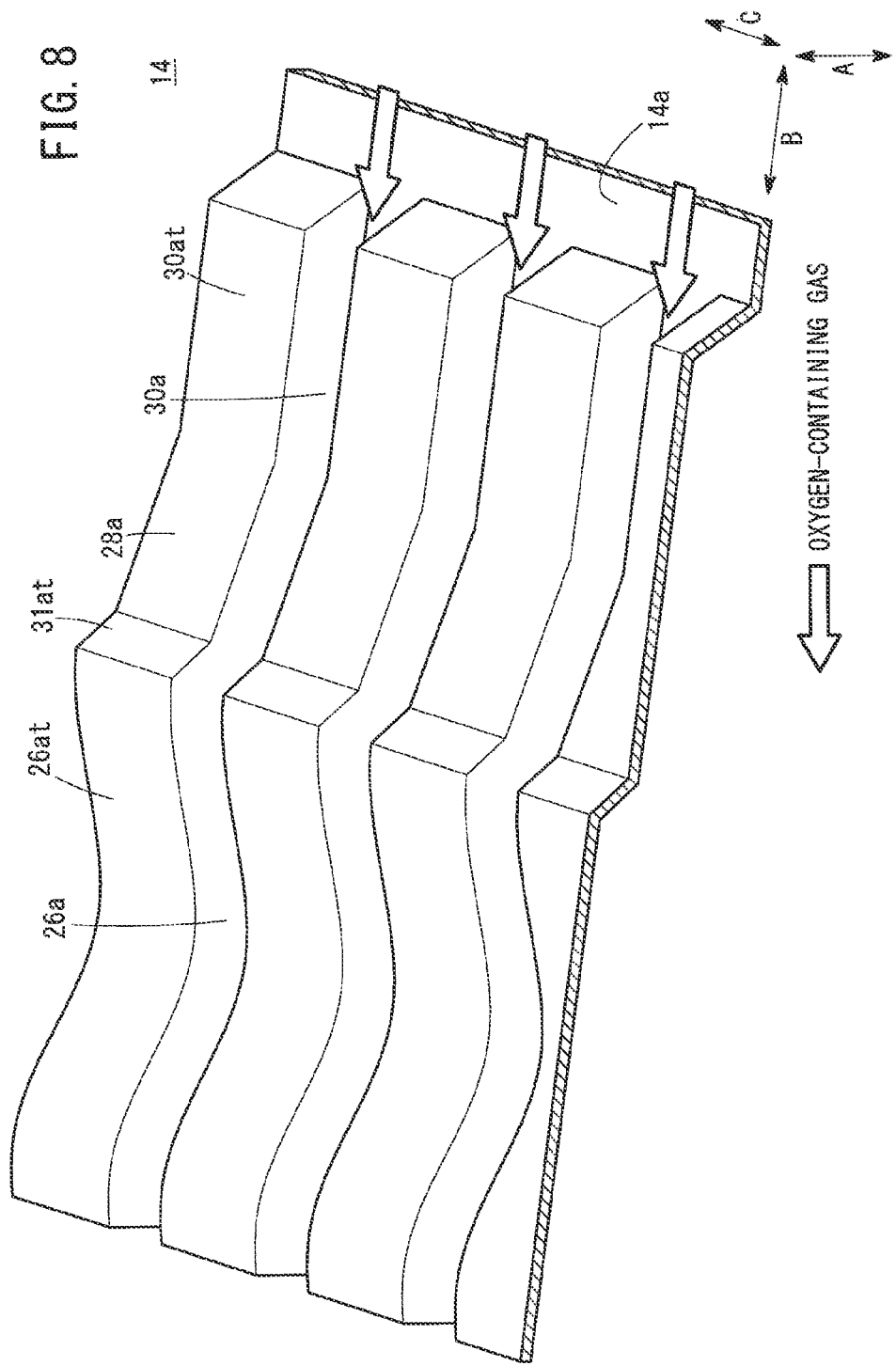
FIG. 8 is an enlarged perspective view showing main components of the first metal separator.

As shown in FIGS. 5 and 8, on the surface 14a, the inlet merging area 28a is configured to allow merging of flows in the flow field width direction by reducing the upper portions of a height h1 of wavy ridges 26at formed between the wavy flow grooves 26a. As shown in FIG. 6, on the surface 14a, the outlet merging area 28b is configured to allow merging of flows in the flow field width direction by reducing the upper portions of the height of the ridges 26at formed between the wavy flow grooves 26a.

The inlet merging area 28a is connected to a plurality of connection flow grooves 30a on a side opposite to the wavy flow grooves 26a. The groove depth (height h2) of the connection flow grooves 30a is smaller than the groove depth of the wavy flow grooves 26a. Each of the connection flow grooves 30a has a straight pattern, i.e., the connection flow grooves 30a extend in a straight pattern. The connection flow grooves 30a are provided at positions corresponding to the ends of the wavy flow grooves 26a.

As shown in FIG. 8, ridges 31at connected to the ridges 26at forming the wavy flow grooves 26a and ridges 30at forming the connection flow grooves 30a are inclined to form upward slopes from the ridges 30at toward the ridges 26at. The slopes of the ridges 31at form a merging channel for merging of the flows in a direction (indicated by the arrow C) intersecting with the flow direction of the oxygen-containing gas, i.e., the slopes of the ridges 31at form the inlet merging area 28a.

As shown in FIG. 6, the outlet merging area 28b is connected to a plurality of connection flow grooves 30b, on a side opposite to the wavy flow grooves 26a. The groove depth of the connection flow grooves 30b is smaller than the groove depth of the wavy flow grooves 26a. Each of the connection flow grooves 30b has a straight pattern. The connection flow grooves 30b are provided at positions corresponding to the ends of the wavy flow grooves 26a. Ridges 31bt connected to the ridges 26at forming the wavy flow grooves 26a and ridges 30bt forming the connection flow grooves 30b are inclined to form upward slopes from the ridges 30bt toward the ridges 26at. The slopes of the ridges 31bt form a merging channel for merging of the flows in a direction intersecting with the flow direction of the oxygen-containing gas, i.e., the slopes of the ridges 31bt form the outlet merging area 28b.

As shown in FIG. 7, an inlet flat area 32a is provided outside the connection flow grooves 30a, and an outlet flat area 32b is provided outside the connection flow grooves 30b. A plurality of inlet connection flow grooves 34a are formed between the inlet flat area 32a and the oxygen-containing gas supply passage 22a, and a plurality of outlet connection flow grooves 34b are formed between the outlet flat area 32b and the oxygen-containing gas discharge passage 22b.

As shown in FIG. 1, a coolant flow field 36 is formed on a surface 14b of the first metal separator 14. The coolant flow field 36 is connected to the pair of coolant supply passages 25a and the pair of coolant discharge passages 25b. The coolant flow field 36 is formed between the back surface of the first oxygen-containing gas flow field 26 and the back surface of a second fuel gas flow field 58 described later when the first metal separator 14 and the third metal separator 20 are stacked together.

The second metal separator 18 has a first fuel gas flow field 38 on its surface 18a facing the first membrane electrode assembly 16a. The first fuel gas flow field 38 is connected to the fuel gas supply passage 24a and the fuel gas discharge passage 24b. The first fuel gas flow field 38 includes a plurality of wavy flow grooves (or straight flow grooves) 38a extending in the direction indicated by the arrow B. The wavy flow grooves 38a may extend in a zigzag pattern including straight segments, instead of the curved wavy pattern including curved segments. In the case of adopting grooves in the zigzag pattern, the grooves may include rounded segments at corners of the zigzag pattern.

A slope area 40a is provided at an end of the first fuel gas flow field 38 on the fuel gas inlet side and a slope area 40b is provided at the other end of the first fuel gas flow field 38 on the fuel gas outlet side. The slope area 40a and the slope area 40b are inclined in the flow field depth direction. The slope area 40a corresponds to the back surface of an outlet merging area 50b described later, and the slope area 40b corresponds to the back surface of an inlet merging area 50a described later.

The slope area 40a is connected to a plurality of connection flow grooves 42a. Each of the connection flow grooves 42a has a straight pattern. The connection flow grooves 42a are provided at positions corresponding to the ends of the wavy flow grooves 38a. The slope area 40b is connected to a plurality of connection flow grooves 42b. Each of the connection flow grooves 42b has a straight pattern. The connection flow grooves 42b are provided at positions corresponding to the ends of the wavy flow grooves 38a.

As shown in FIG. 1, an inlet flat area 44a is provided outside the connection flow grooves 42a, and an outlet flat area 44b is provided outside the connection flow grooves 42b. A plurality of supply holes 46a are formed in the inlet flat area 44a adjacent to the fuel gas supply passage 24a. A plurality of discharge holes 46b are formed in the outlet flat area 44b adjacent to the fuel gas discharge passage 24b.

Figure 9:
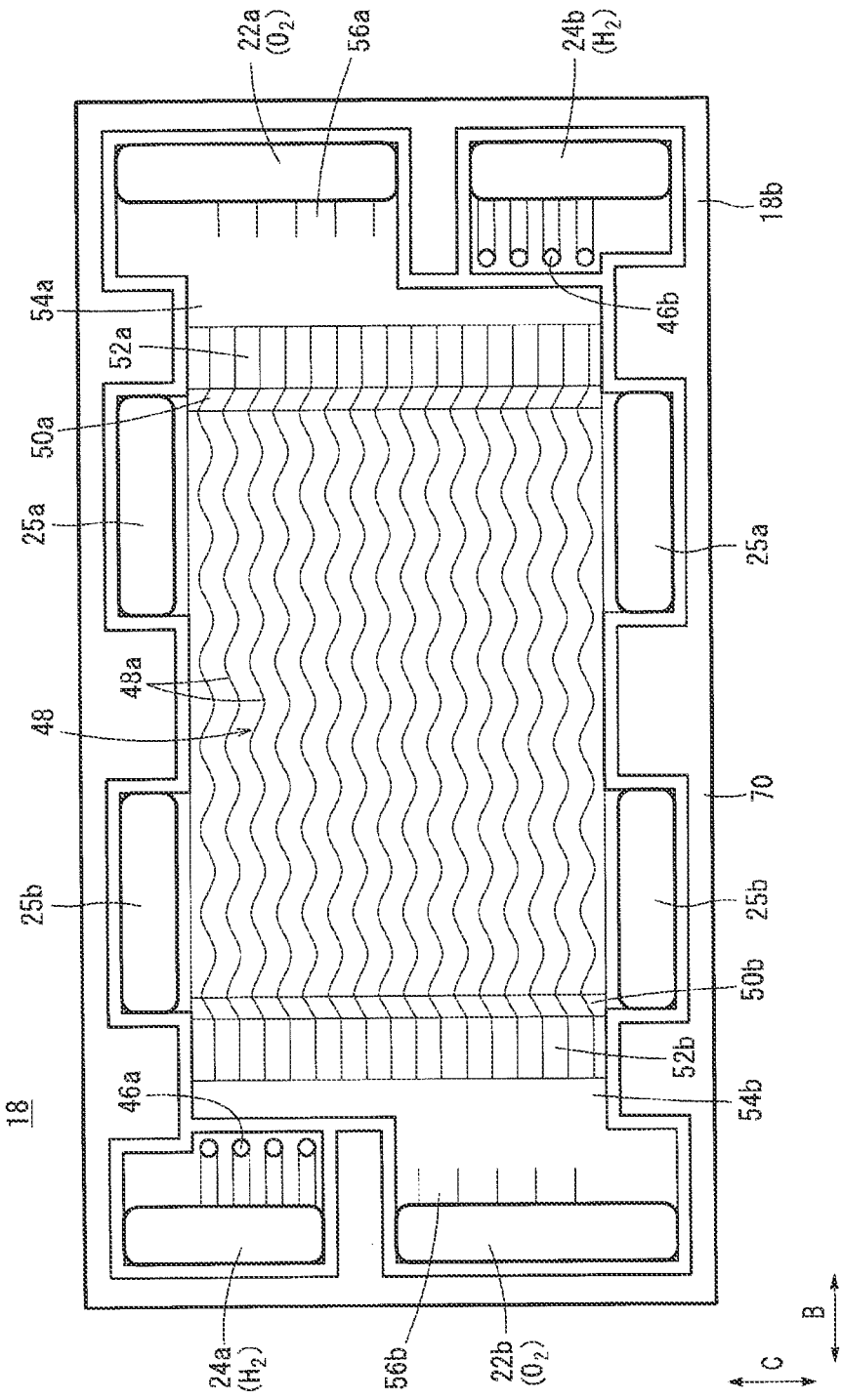
FIG. 9 is a front view showing a second metal separator of the power generation unit.

As shown in FIGS. 1 and 9, the second metal separator 18 has a second oxygen-containing gas flow field 48 on its surface 18b facing the second membrane electrode assembly 16b. The second oxygen-containing gas flow field 48 is connected to the oxygen-containing gas supply passage 22a and the oxygen-containing gas discharge passage 22b. The second oxygen-containing gas flow field 48 includes a plurality of wavy flow grooves (or straight flow grooves) 48a extending in the direction indicated by the arrow B. The wavy flow grooves 48a may extend in a zigzag pattern including straight segments, instead of the curved wavy pattern including curved segments. In the case of adopting grooves in the zigzag pattern, the grooves may include rounded segments at corners of the zigzag pattern.

The inlet merging area 50a is provided at an end of the second oxygen-containing gas flow field 48 on the oxygen-containing gas inlet side, and the outlet merging area 50b is provided at the other end of the second oxygen-containing gas flow field 48 on the oxygen-containing gas outlet side. As shown in FIGS. 5 and 9, on the surface 18b, the inlet merging area 50a is configured to allow merging of flows in the flow field width direction by reducing the upper portions of the height h3 of wavy ridges 48at formed between the wavy flow grooves 48a. As shown in FIG. 6, on the surface 18b, the outlet merging area 50b is configured to allow merging of flows in the flow field width direction by reducing the upper portions of the height of the wavy ridges 48at formed between the wavy flow grooves 48a.

The inlet merging area 50a is connected to a plurality of connection flow grooves 52a (back surface of the connection flow grooves 42b) on a side opposite to the wavy flow grooves 48a. The groove depth (height h4) of the connection flow grooves 52a is smaller than the groove depth of the wavy flow grooves 48a. Each of the connection flow grooves 52a has a straight pattern. The connection flow grooves 52a are provided at positions corresponding to the ends of the wavy flow grooves 48a. As shown in FIG. 5, ridges 53at connected to the ridges 48at forming the wavy flow grooves 48a and to ridges 52at forming connection flow grooves 52a are inclined to form upward slopes from the ridges 52at toward the ridges 48at. The slopes of the ridges 53at form a merging channel for merging of the flows in a direction (indicated by the arrow C) intersecting with the flow direction of the oxygen-containing gas, i.e., the slopes of the ridges 53at form the inlet merging area 50a.

The outlet merging area 50b is connected to a plurality of connection flow grooves 52b (back surface of the connection flow grooves 42a) on a side opposite to the wavy flow grooves 48a. The groove depth of the connection flow grooves 52b is smaller than the groove depth of the wavy flow grooves 48a. Each of the connection flow grooves 52b has a straight pattern. The connection flow grooves 52b are provided at positions corresponding to the ends of the wavy flow grooves 48a. Ridges 53bt connected to the ridges 48at forming the wavy flow grooves 48a and ridges 52bt forming the connection flow grooves 52b are inclined to form upward slopes from the ridges 52bt toward the ridges 48at. The slopes of the ridges 53bt form a merging channel for merging of the flows in a direction intersecting with the flow direction of the oxygen-containing gas, i.e., the slopes of the ridges 53bt form the outlet merging area 50b.

As shown in FIG. 9, an inlet flat area 54a is provided outside the connection flow grooves 52a, and an outlet flat area 54b is provided outside the connection flow grooves 52b. The inlet flat area 54a and the outlet flat area 54b correspond to the back surfaces of the outlet flat area 44b and the inlet flat area 44a, respectively. The inlet flat area 54a and the outlet flat area 54b are deeper than the inlet flat area 44a and the outlet flat area 44b. A plurality of inlet connection flow grooves 56a are formed between the inlet flat area 54a and the oxygen-containing gas supply passage 22a, and a plurality of outlet connection flow grooves 56b are formed between the outlet flat area 54b and the oxygen-containing gas discharge passage 22b.

As shown in FIG. 1, the third metal separator 20 has the second fuel gas flow field 58 on its surface 20a facing the second membrane electrode assembly 16b. The second fuel gas flow field 58 is connected to the fuel gas supply passage 24a and the fuel gas discharge passage 24b. The second fuel gas flow field 58 includes a plurality of wavy flow grooves (or straight flow grooves) 58a extending in the direction indicated by the arrow B. The wavy flow grooves 58a may extend in a zigzag pattern including straight segments, instead of the curved wavy pattern including curved segments. In the case of adopting grooves in the zigzag pattern, the grooves may include rounded segments at corners of the zigzag pattern. A slope area 60a is provided at an end of the second fuel gas flow field 58 on the fuel gas inlet side, and a slope area 60b is provided at the other end of the second fuel gas flow field 58 on the fuel gas outlet side.

The slope area 60a is connected to a plurality of connection flow grooves 62a. Each of the connection flow grooves 62a has a straight pattern. The connection flow grooves 62a are provided at positions corresponding to the ends of the wavy flow grooves 58a. The slope area 60b is connected to a plurality of connection flow grooves 62b. Each of the connection flow grooves 62b has a straight pattern. The connection flow grooves 62b are provided at positions corresponding to the ends of the wavy flow grooves 58a.

An inlet flat area 64a is provided outside the connection flow grooves 62a, and an outlet flat area 64b is provided outside the connection flow grooves 62b. A plurality of supply holes 66a are formed in the inlet flat area 64a adjacent to the fuel gas supply passage 24a. A plurality of discharge holes 66b are formed in the outlet flat area 64b adjacent to the fuel gas discharge passage 24b.

As shown in FIG. 1, a first seal member 68 is formed integrally with the surfaces 14a, 14b of the first metal separator 14, around the outer circumferential end of the first metal separator 14. A second seal member 70 is formed integrally with the surfaces 18a, 18b of the second metal separator 18, around the outer circumferential end of the second metal separator 18. A third seal member 71 is formed integrally with the surfaces 20a, 20b of the third metal separator 20, around the outer circumferential end of the third metal separator 20. Each of the first seal member 68, the second seal member 70, and the third seal member 71 integrally includes a planar seal having a uniform thickness along the separator surface, and a ridge seal for sealing the fuel cell stack with respect to the oxygen-containing gas, the fuel gas, and the coolant in an air-tight manner and liquid-tight manner.

For example, each of the first seal member 68, the second seal member 70, and the third seal member 71 is an elastic seal member made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Figure 2:
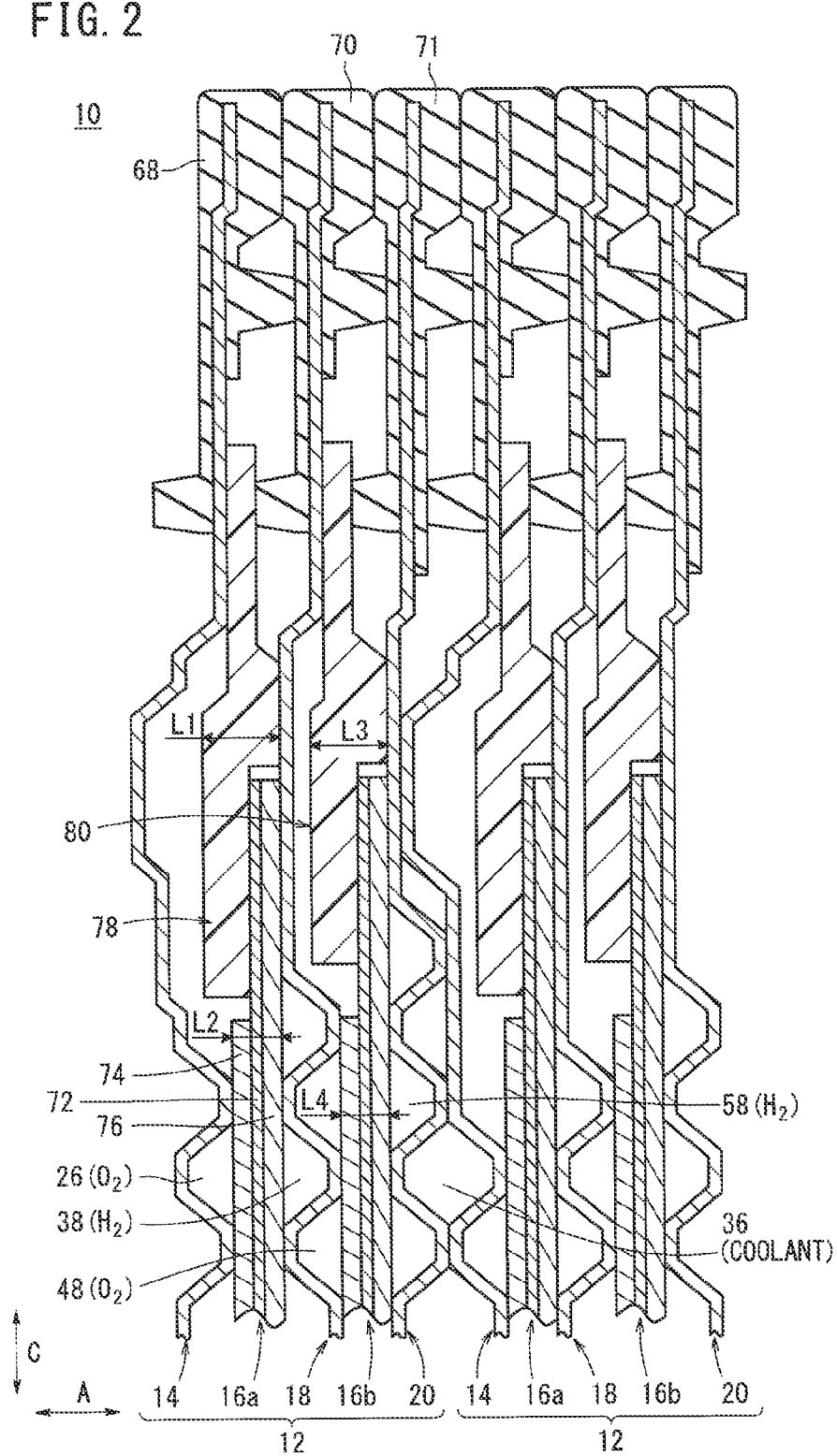
FIG. 2 is a cross sectional view showing the power generation unit, taken along a line II-II in FIG. 1.

As shown in FIG. 2, each of the first membrane electrode assembly 16a and the second membrane electrode assembly 16b includes a solid polymer electrolyte membrane (cation exchange membrane) 72 formed by impregnating a thin membrane of perfluorosulfonic acid with water, for example. The solid polymer electrolyte membrane 72 is interposed between a cathode 74 and an anode 76. Each of the first membrane electrode assembly 16a and the second membrane electrode assembly 16b is an MEA having different sizes of components where the plane size (surface area) of the cathode 74 is smaller than the plane sizes (surface areas) of the anode 76 and the solid polymer electrolyte membrane 72.

It should be noted that the cathode 74, the anode 76, and the solid polymer electrolyte membrane 72 may have the same plane size. Further, the plane size of the anode 76 may be smaller than the plane sizes of the cathode 74 and the solid polymer electrolyte membrane 72.

Each of the cathode 74 and the anode 76 has a gas diffusion layer (not shown) such as carbon paper, and an electrode catalyst layer (not shown) of platinum alloy supported on porous carbon particles. The carbon particles are deposited uniformly on the surface of the gas diffusion layer. The electrode catalyst layer of the cathode 74 and the electrode catalyst layer of the anode 76 are fixed to both surfaces of the solid polymer electrolyte membrane 72, respectively.

As shown in FIGS. 1 to 6, in the first membrane electrode assembly 16a, a first resin frame member (resin frame member) 78 is formed integrally with an outer marginal portion of the solid polymer electrolyte membrane 72, outside the terminal end of the cathode 74, e.g., by injection molding. Alternatively, a rein frame member produced beforehand may be joined to the outer marginal portion of the solid polymer electrolyte membrane 72. As shown in FIG. 2, a portion of the first resin frame member 78 joined to the first membrane electrode assembly 16a has a thickness L1, and the thickness L1 is larger than the thickness L2 of the first membrane electrode assembly 16a. The surfaces of the anode 76 and the first resin frame member 78 which contact the second metal separator 18 are flush with each other without any steps.

In the second membrane electrode assembly 16b, a second resin frame member (resin frame member) 80 is formed integrally with an outer marginal portion of the solid polymer electrolyte membrane 72, outside the terminal end of the cathode 74, e.g., by injection molding. Alternatively, a rein frame member produced beforehand may be joined to the outer marginal portion of the solid polymer electrolyte membrane 72. A portion of the second resin frame member 80 joined to the second membrane electrode assembly 16b has a thickness L3, and the thickness L3 is larger than the thickness L4 of the second membrane electrode assembly 16b. The surfaces of the anode 76 and the second resin frame member 80 which contact the third metal separator 20 are flush with each other without any steps.

As the resin material of the first resin frame member 78 and the second resin frame member 80, for example, in addition to general purpose plastic, engineering plastic, super engineering plastic or the like is adopted.

As shown in FIG. 1, an inlet buffer 82a is provided on a surface of the first resin frame member 78 between the oxygen-containing gas supply passage 22a and the inlet side of the first oxygen-containing gas flow field 26, the surface being on the cathode 74 side. An outlet buffer 82b is provided between the oxygen-containing gas discharge passage 22b and the outlet side of the first oxygen-containing gas flow field 26. The inlet buffer 82a and the outlet buffer 82b face the inlet flat area 32a and the outlet flat area 32b of the first metal separator 14, respectively.

The inlet buffer 82a includes a plurality of bosses 84a and a plurality of linear inlet guide grooves 86a. The outlet buffer 82b includes a plurality of bosses 84b and a plurality of linear outlet guide grooves 86b.

Figure 10:
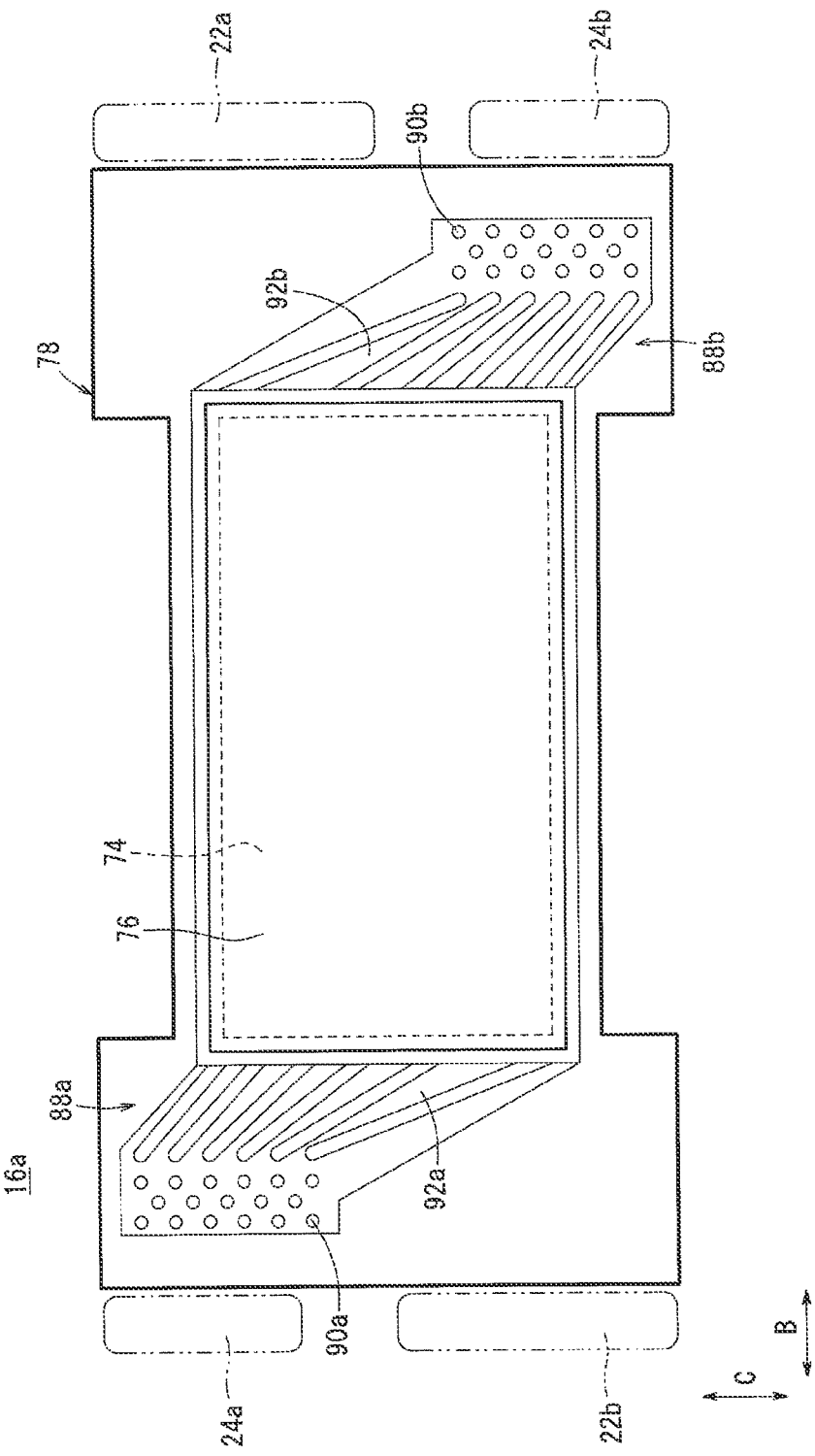
FIG. 10 is a front view showing a first membrane electrode assembly of the power generation unit.

As shown in FIG. 10, an inlet buffer 88a is provided on a surface of the first resin frame member 78 between the fuel gas supply passage 24a and the first fuel gas flow field 38, the surface being on the anode 76 side. An outlet buffer 88b is provided between the fuel gas discharge passage 24b and the first fuel gas flow field 38. The inlet buffer 88a and the outlet buffer 88b face the inlet flat area 44a and the outlet flat area 44b of the second metal separator 18, respectively.

The inlet buffer 88a includes a plurality of bosses 90a and a plurality of linear inlet guide grooves 92a. The outlet buffer 88b includes a plurality of bosses 90b and a plurality of linear outlet guide grooves 92b.

As shown in FIG. 1, an inlet buffer 94a is provided on a surface of the second resin frame member 80 between the oxygen-containing gas supply passage 22a and the second oxygen-containing gas flow field 48, the surface being on the cathode 74 side. An outlet buffer 94b is provided between the oxygen-containing gas discharge passage 22b and the second oxygen-containing gas flow field 48. The inlet buffer 94a and the outlet buffer 94b face the inlet flat area 54a and the outlet flat area 54b of the second metal separator 18, respectively.

The inlet buffer 94a includes a plurality of bosses 96a and a plurality of linear inlet guide grooves 98a. The outlet buffer 94b includes a plurality of bosses 96b and a plurality of linear outlet guide grooves 98b.

Figure 11:
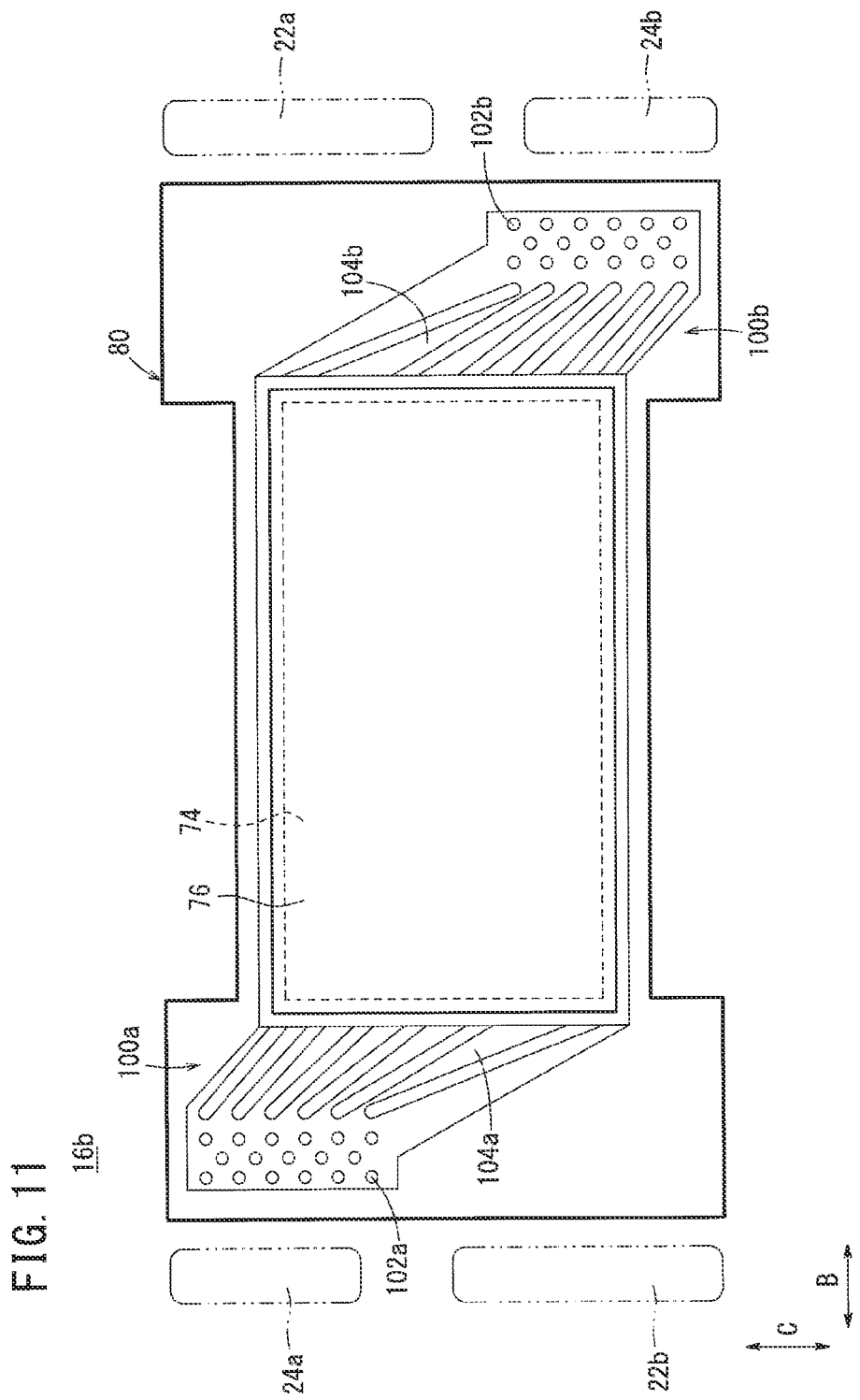
FIG. 11 is a front view showing a second membrane electrode assembly of the power generation unit.

As shown in FIG. 11, an inlet buffer 100a is provided on a surface of the second resin frame member 80 between the fuel gas supply passage 24a and the second fuel gas flow field 58, the surface being on the anode 76 side. An outlet buffer 100b is provided between the fuel gas discharge passage 24b and the second fuel gas flow field 58. The inlet buffer 100a and the outlet buffer 100b face the inlet flat area 64a and the outlet flat area 64b of the third metal separator 20, respectively.

The inlet buffer 100a includes a plurality of bosses 102a and a plurality of linear inlet guide grooves 104a. The outlet buffer 100b includes a plurality of bosses 102b and a plurality of linear outlet guide grooves 104b.

The power generation units 12 are stacked together. Thus, the coolant flow field 36 is formed between the first metal separator 14 of one of the adjacent power generation units 12 and the third metal separator 20 of the other of the adjacent power generation units 12.

As shown in FIG. 5, the inlet merging area 28a is provided adjacent to an inner side of the first resin frame member 78, and the inlet merging area 50a is provided adjacent to an inner side of the second resin frame member 80. The connection flow grooves 30a are provided at positions facing the first resin frame member 78 in the stacking direction, and the connection flow grooves 52a are provided at positions facing the second resin frame member 80 in the stacking direction.

As shown in FIG. 6, the outlet merging area 28b is provided adjacent to an inner side of the first resin frame member 78, and the outlet merging area 50b is provided adjacent to an inner side of the second resin frame member 80. The connection flow grooves 30b are provided at positions facing the first resin frame member 78 in the stacking direction, and the connection flow grooves 52b are provided at positions facing the second resin frame member 80 in the stacking direction.

Operation of the fuel cell stack 10 will be described below.

Firstly, as shown in FIG. 1, an oxygen-containing gas is supplied to the oxygen-containing gas supply passage 22a, and a fuel gas such as a hydrogen-containing gas is supplied to the fuel gas supply passage 24a. Further, a coolant such as pure water, ethylene glycol, oil, or the like is supplied to the pair of the coolant supply passages 25a.

Thus, as shown in FIG. 5, some of the oxygen-containing gas flows from the oxygen-containing gas supply passage 22a through the inlet buffer 82a into the first oxygen-containing gas flow field 26 of the first metal separator 14. The remaining oxygen-containing gas flows from the oxygen-containing gas supply passage 22a into the second oxygen-containing gas flow field 48 of the second metal separator 18.

As shown in FIGS. 1 and 6, some of the oxygen-containing gas moves along the first oxygen-containing gas flow field 26 in the horizontal direction indicated by the arrow B, and the oxygen-containing gas is supplied to the cathode 74 of the first membrane electrode assembly 16a. Further, the remaining oxygen-containing gas moves along the second oxygen-containing gas flow field 48 in the direction indicated by the arrow B, and the oxygen-containing gas is supplied to the cathode 74 of the second membrane electrode assembly 16b.

Figure 3:
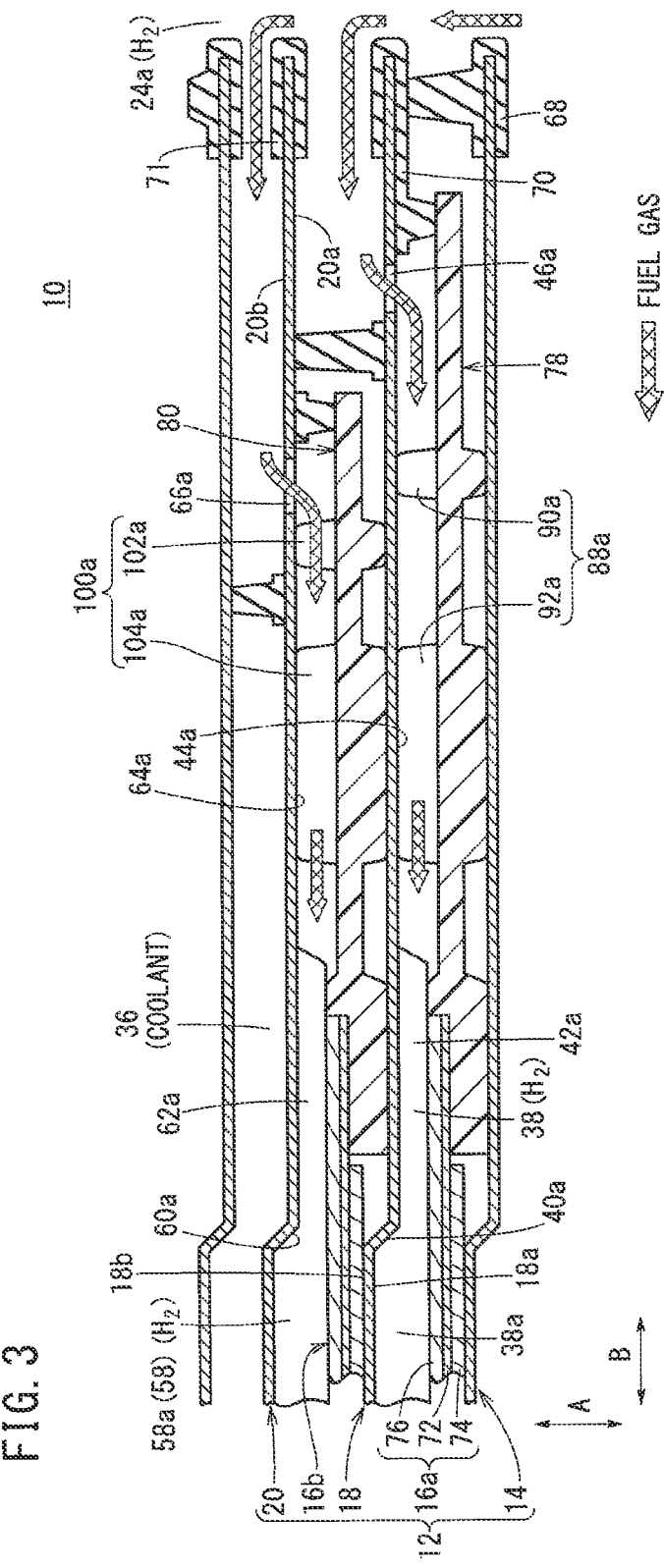
FIG. 3 is a cross sectional view showing the power generation unit, taken along a line III-III in FIG. 1.

In the meanwhile, as shown in FIG. 3, some of the fuel gas flows from the fuel gas supply passage 24a through the supply holes 46a of the second metal separator 18 into the inlet buffer 88a. Then, the fuel gas flows through the inlet buffer 88a, and the fuel gas is supplied to the first fuel gas flow field 38 of the second metal separator 18.

The remaining fuel gas flows from the fuel gas supply passage 24a through the supply holes 66a of the third metal separator 20, and the fuel gas is supplied to the inlet buffer 100a. The fuel gas flows though the inlet buffer 100a, and the fuel gas is supplied to the second fuel gas flow field 58 of the third metal separator 20.

As shown in FIG. 1, the fuel gas flows along the first fuel gas flow field 38 in the direction indicated by the arrow B, and the fuel gas is supplied to the anode 76 of the first membrane electrode assembly 16a. The remaining fuel gas flows along the second fuel gas flow field 58 in the direction indicated by the arrow B, and the fuel gas is supplied to the anode 76 of the second membrane electrode assembly 16b.

Thus, in each of the first membrane electrode assembly 16a and the second membrane electrode assembly 16b, the oxygen-containing gas supplied to the cathode 74, and the fuel gas supplied to the anode 76 are partially consumed in electrochemical reactions at catalyst layers of the cathode 74 and the anode 76 for generating electricity.

Then, the oxygen-containing gas partially consumed at the cathodes 74 of the first membrane electrode assembly 16a and the second membrane electrode assembly 16b is discharged from the outlet buffer 82b, 94b to the oxygen-containing gas discharge passage 22b.

Figure 4:
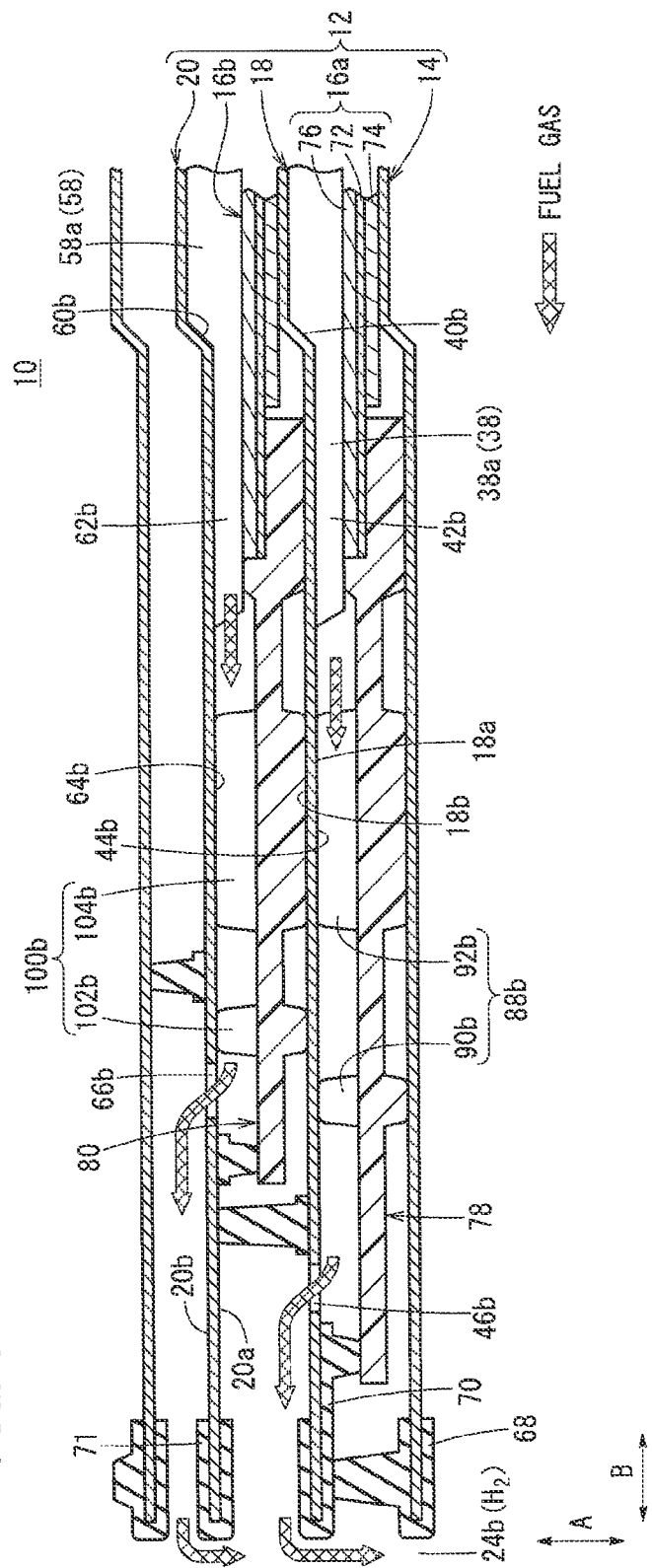
FIG. 4 is a cross sectional view showing the power generation unit, taken along a line IV-IV in FIG. 1.

As shown in FIG. 4, the fuel gas partially consumed at the anodes 76 of the first membrane electrode assembly 16a and the second membrane electrode assembly 16b flows into the outlet buffers 88b, 100b. Then, the fuel gas flows through the discharge holes 46b, 66b, and the fuel gas is discharged into the fuel gas discharge passage 24b.

In the meanwhile, as shown in FIG. 1, the coolant supplied to the pair of coolant supply passages 25a flows into the coolant flow field 36. After the coolant temporarily flows inward in the direction indicated by the arrow C, the coolant moves in the direction indicated by the arrow B to cool the first membrane electrode assembly 16a and the second membrane electrode assembly 16b. This coolant moves outward in the direction indicated by the arrow C, and then, the coolant is discharged into the pair of coolant discharge passages 25b.

In the first embodiment, as shown in FIG. 6, the outlet merging area 28b extending in the direction intersecting with the flow direction of the oxygen-containing gas is provided at the end of the first oxygen-containing gas flow field 26 on the outlet side. The outlet merging area 28b is connected to the plurality of straight connection flow grooves 30b on the side opposite to the wavy flow grooves 26a. The groove depth of the connection flow grooves 30b is smaller than the groove depth of the wavy flow grooves 26a. That is, the outlet merging area 28b is provided in an area where the groove depth (flow field height) is decreased from the wavy flow grooves 26a to the connection flow grooves 30b.

Further, the outlet merging area 50b extending in the direction intersecting with the flow direction of the oxygen-containing gas is provided at the end of the second oxygen-containing gas flow field 48 on the outlet side. The outlet merging area 50b is connected to the plurality of straight connection flow grooves 52b on the side opposite to the wavy flow grooves 48a. The groove depth of the connection flow grooves 52b is smaller than the groove depth of the wavy flow grooves 48a. That is, the outlet merging area 50b is provided in an area where the groove depth (flow field height) is decreased from the wavy flow grooves 48a to the connection flow grooves 52b.

In the structure, flows of the oxygen-containing gas from the wavy flow grooves 26a are temporarily merged in the outlet merging area 28b, and then, the oxygen-containing gas is distributed to the connection flow grooves 30b. Likewise, flows of the oxygen-containing gas flowing from the wavy flow grooves 48a are temporarily merged in the outlet merging area 50b, and then, the oxygen-containing gas is distributed to the connection flow grooves 52b. Accordingly, improvement in the flowability of the oxygen-containing gas is achieved. Thus, with simple and economical structure, improvement in the performance of distributing the oxygen-containing gas to the wavy flow grooves 26a, 48a is achieved. Moreover, improvement in the performance of discharging the water produced in the power generation is achieved suitably. It becomes possible to maintain a desired power generation performance.

Further, as shown in FIG. 5, the inlet merging area 28a is provided at the end of the first oxygen-containing gas flow field 26 on the inlet side. The inlet merging area 28a is connected to the straight connection flow grooves 30a on the side opposite to the wavy flow grooves 26a. The groove depth (height h2) of the connection flow grooves 30a is smaller than the groove depth of the wavy flow grooves 26a. That is, the inlet merging area 28a is provided in an area where the groove depth (flow field height) is decreased from the wavy flow grooves 26a to the connection flow grooves 30a.

Further, the inlet merging area 50a is provided at the end of the second oxygen-containing gas flow field 48 on the inlet side. The inlet merging area 50a is connected to the straight connection flow grooves 52a on the side opposite to the wavy flow grooves 48a. The groove depth (height h4) of the connection flow grooves 52a is smaller than the groove depth of the wavy flow grooves 48a. That is, the inlet merging area 50a is provided in an area where the groove depth (flow field height) is decreased from the wavy flow grooves 48a to the connection flow grooves 52a.

In the structure, flows of the oxygen-containing gas are suitably merged in the inlet merging areas 28a and 50a. Therefore, improvement in the flowability of the oxygen-containing gas is achieved. Thus, with simple and economical structure, improvement in the performance of distributing the oxygen-containing gas to the wavy flow grooves 26a, 48a is achieved suitably. It becomes possible to maintain a desired power generation performance.

Figure 12:
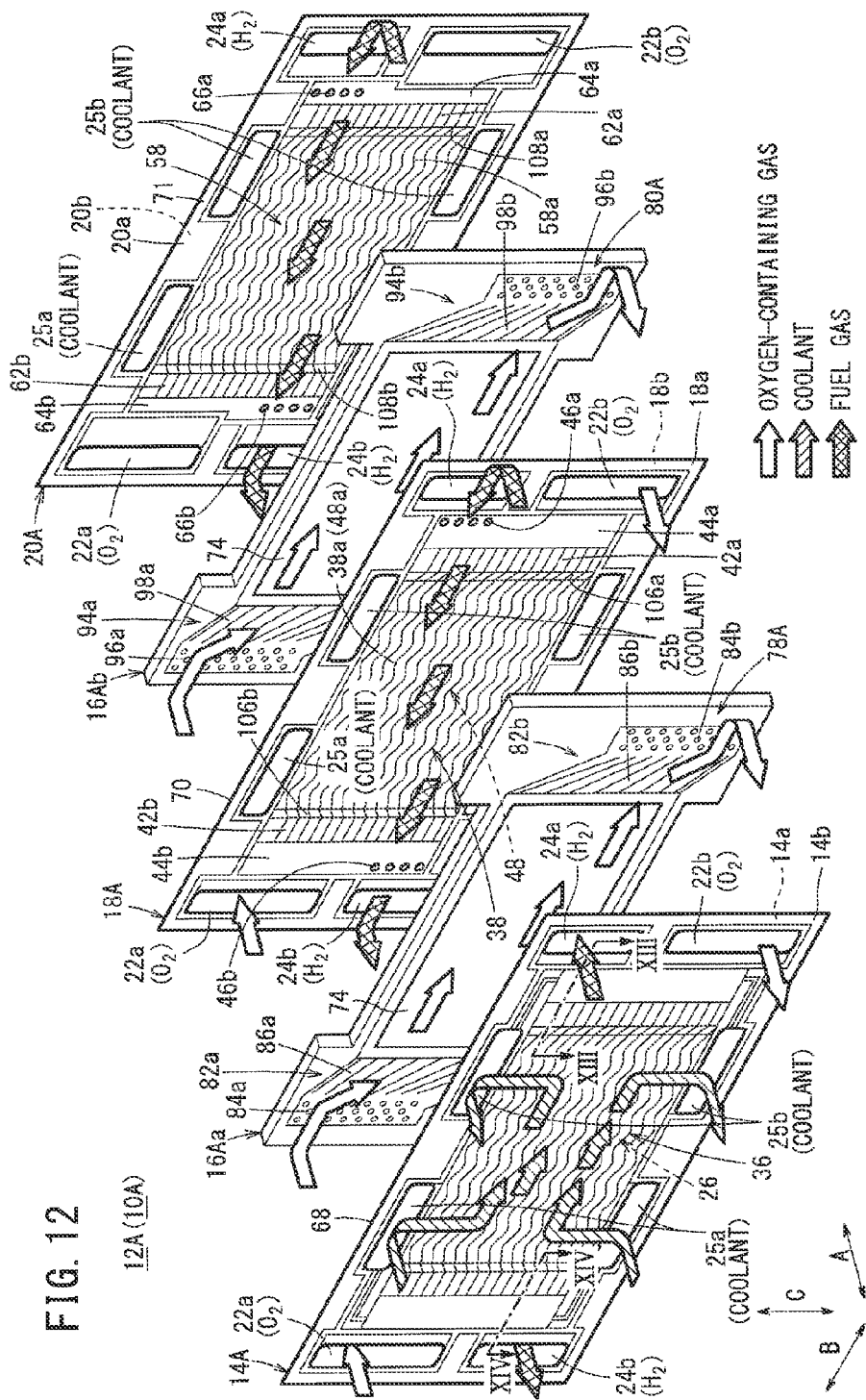
FIG. 12 is an exploded perspective view showing main components of a power generation unit of a fuel cell according to a second embodiment of the present invention.
Figure 13:
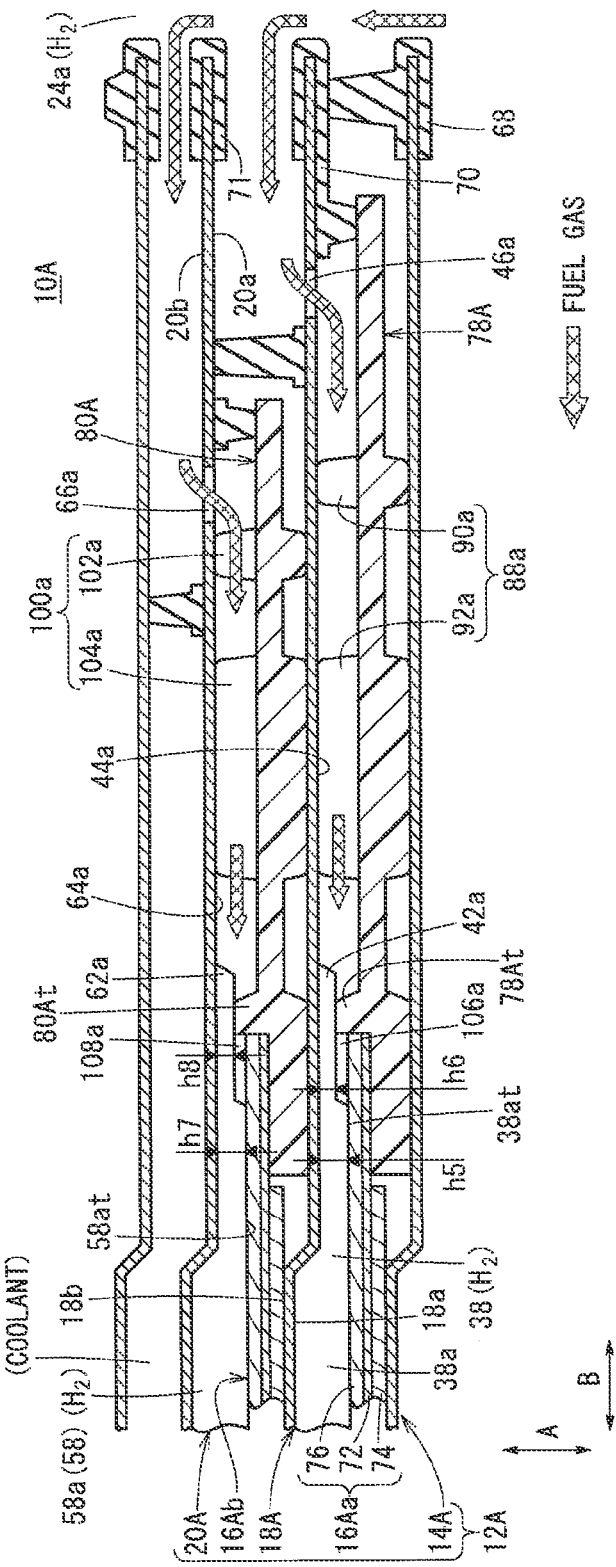
FIG. 13 is a cross sectional view showing the power generation unit, taken along a line XIII-XIII in FIG. 12.
Figure 14:
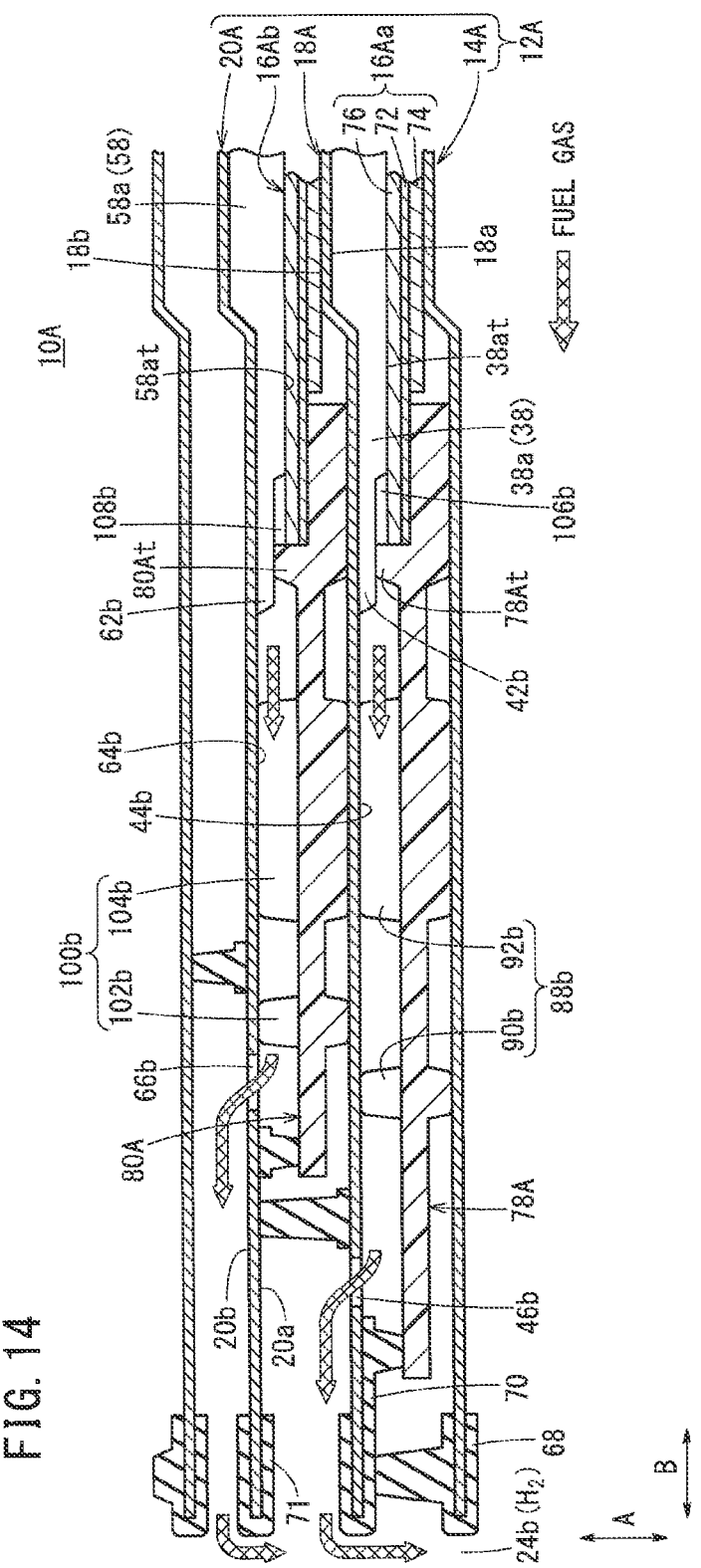
FIG. 14 is a cross sectional view showing the power generation unit, taken along a line XIV-XIV in FIG. 12.

As shown in FIGS. 12 to 14, a fuel cell stack 10A (fuel cell) according to a second embodiment of the present invention includes a power generation unit 12A. A plurality of power generation units 12A are stacked together in a horizontal direction indicated by an arrow A or in a vertical direction indicated by an arrow C. The constituent elements that are identical to those of the fuel cell stack 10 according to the first embodiment are labeled with the same reference numerals and description thereof is omitted. Further, also in a third embodiment described later, description of the constituent elements that are identical to those of the fuel cell stack 10 according to the first embodiment is omitted.

The power generation unit 12A includes a first metal separator 14A, a first membrane electrode assembly 16Aa, a second metal separator 18A, a second membrane electrode assembly 16Ab, and a third metal separator 20A. As shown in FIGS. 13 and 14, a first resin frame member 78A of the first membrane electrode assembly 16Aa includes a ridge 78At on its surface which contacts the second metal separator 18A. The ridge 78At protrudes toward the second metal separator 18A beyond the anode 76. A second resin frame member 80A of the second membrane electrode assembly 16Ab includes a ridge 80At on its surface which contacts the third metal separator 20A. The ridge 80At protrudes toward the third metal separator 20A beyond the anode 76.

A first fuel gas flow field 38 is formed on a surface 18a of the second metal separator 18A. An inlet merging area 106a is provided at the end of the first fuel gas flow field 38 on the inlet side and an outlet merging area 106b is provided at the end of the first fuel gas flow field 38 on the outlet side. As shown in FIG. 13, on the surface 18a, the inlet merging area 106a is configured to allow merging of flows in the flow field width direction, at the lower portions of wavy ridges 38at having the height h5 formed between the wavy flow grooves 38a. As shown in FIG. 14, on the surface 18a, the outlet merging area 106b is configured to allow merging of flows in the flow field width direction, at the lower portions of wavy ridges 38at formed between the wavy flow grooves 38a.

The inlet merging area 106a is connected to a plurality of connection flow grooves 42a on a side opposite to the wavy flow grooves 38a. The groove depth (height h6) of the connection flow grooves 42a is smaller than the groove depth of the wavy flow grooves 38a. Each of the connection flow grooves 42a has a straight pattern. The connection flow grooves 42a are provided at positions corresponding to the ends of the wavy flow grooves 38a.

As shown in FIG. 14, the outlet merging area 106b is connected to a plurality of connection flow grooves 42b on a side opposite to the wavy flow grooves 38a. The groove depth of the connection flow grooves 42b is smaller than the groove depth of the wavy flow grooves 38a. Each of the connection flow grooves 42b has a straight pattern. The connection flow grooves 42b are provided at positions corresponding to the ends of the wavy flow grooves 38a.

As shown in FIG. 12, a second fuel gas flow field 58 is formed on a surface 20a of the third metal separator 20A. An inlet merging area 108a is provided at the end of the second fuel gas flow field 58 on the inlet side and an outlet merging area 108b is provided at the end of the second fuel gas flow field 58 on the outlet side. As shown in FIG. 13, on the surface 20a, the inlet merging area 108a is configured to allow merging of flows in the flow field width direction, at the lower portions of wavy ridges 58at having the height h7 formed between the wavy flow grooves 58a. As shown in FIG. 14, on the surface 20a, the outlet merging area 108b is configured to allow merging of flows in the flow field width direction, at the lower portions of the wavy ridges 58at formed between the wavy flow grooves 58a.

The inlet merging area 108a is connected to a plurality of connection flow grooves 62a on a side opposite to the wavy flow grooves 58a. The groove depth (height h8) of the connection flow grooves 62a is smaller than the groove depth of the wavy flow grooves 58a. Each of the connection flow grooves 62a has a straight pattern. The connection flow grooves 62a are provided at positions corresponding to the ends of the wavy flow grooves 58a.

As shown in FIG. 14, the outlet merging area 108b is connected to a plurality of connection flow grooves 62b on a side opposite to the wavy flow grooves 58a. The groove depth of the connection flow grooves 62b is smaller than the groove depth of the wavy flow grooves 58a. Each of the connection flow grooves 62b has a straight pattern. The connection flow grooves 62b are provided at positions corresponding to the ends of the wavy flow grooves 58a.

In the second embodiment, as shown in FIG. 14, the outlet merging area 106b is provided at the end of the first fuel gas flow field 38 on the outlet side. The outlet merging area 106b is connected to the plurality of straight connection flow grooves 42b on the side opposite to the wavy flow grooves 38a. The groove depth of the connection flow grooves 42b is smaller than the groove depth of the wavy flow grooves 38a. That is, the outlet merging area 106b is provided in an area where the groove depth (flow field height) is decreased from the wavy flow grooves 38a to the connection flow grooves 42b.

Further, the outlet merging area 108b is provided at the end of the second fuel gas flow field 58 on the outlet side. The outlet merging area 108b is connected to the plurality of straight connection flow grooves 62b on the side opposite to the wavy flow grooves 58a. The groove depth of the connection flow grooves 62b is smaller than the groove depth of the wavy flow grooves 58a. That is, the outlet merging area 108b is provided in an area where the groove depth (flow field height) is decreased from the wavy flow grooves 58a to the connection flow grooves 62b.

Accordingly, with the simple and economical structure, improvement in the performance of distributing the fuel gas to the wavy flow grooves 38a, 58a is achieved. Moreover, improvement in the performance of discharging the water produced in the power generation is achieved suitably. It becomes possible to maintain the desired power generation performance.

Further, as shown in FIG. 13, the inlet merging area 106a is provided at the end of the first fuel gas flow field 38 on the inlet side. The inlet merging area 106a is connected to the plurality of straight connection flow grooves 42a on the side opposite to the wavy flow grooves 38a. The groove depth (height h6) of the connection flow grooves 42a is smaller than the groove depth of the wavy flow grooves 38a. That is, the inlet merging area 106a is provided in an area where the groove depth (flow field height) is decreased from the wavy flow grooves 38a to the connection flow grooves 42a.

Further, the inlet merging area 108a is provided at the end of the second fuel gas flow field 58 on the inlet side. The inlet merging area 108a is connected to the plurality of straight connection flow grooves 62a on the side opposite to the wavy flow grooves 58a. The groove depth (height h8) of the connection flow grooves 62a is smaller than the groove depth of the wavy flow grooves 58a. That is, the inlet merging area 108a is provided in an area where the groove depth (flow field height) is decreased from the wavy flow grooves 58a to the connection flow grooves 62a. Accordingly, with the simple and economical structure, improvement in the performance of distributing the fuel gas to the wavy flow grooves 38a, 58a is achieved. It becomes possible to maintain the desired power generation performance.

As shown in FIGS. 15 to 19, a fuel cell stack 110 (fuel cell) according to the third embodiment of the present invention includes a power generation unit 112. The fuel cell stack 110 is formed by stacking a plurality of the power generation units 112 together in a horizontal direction indicated by an arrow A or in a vertical direction indicated by an arrow C.

Each of the power generation units 112 includes a first metal separator 114, a first membrane electrode assembly (MEA) 16a, a second metal separator 116, a second membrane electrode assembly (MEA) 16b, and a third metal separator 118.

As shown in FIG. 20, the first metal separator 114 has a first oxygen-containing gas flow field 26 on its surface 114a facing the first membrane electrode assembly 16a. The first oxygen-containing gas flow field 26 is connected to the oxygen-containing gas supply passage 22a and the oxygen-containing gas discharge passage 22b. An inlet merging area 120a is provided at the end of the first oxygen-containing gas flow field 26 on the inlet side, and an outlet merging area 120b is provided at the end of the first oxygen-containing gas flow field 26 on the outlet side. The inlet merging area 120a and the outlet merging area 120b have flat surfaces.

The inlet merging area and the outlet merging area described later have the same structure as the inlet merging area 120a and the outlet merging area 120b described above, and detailed description will be omitted.

Figure 18:
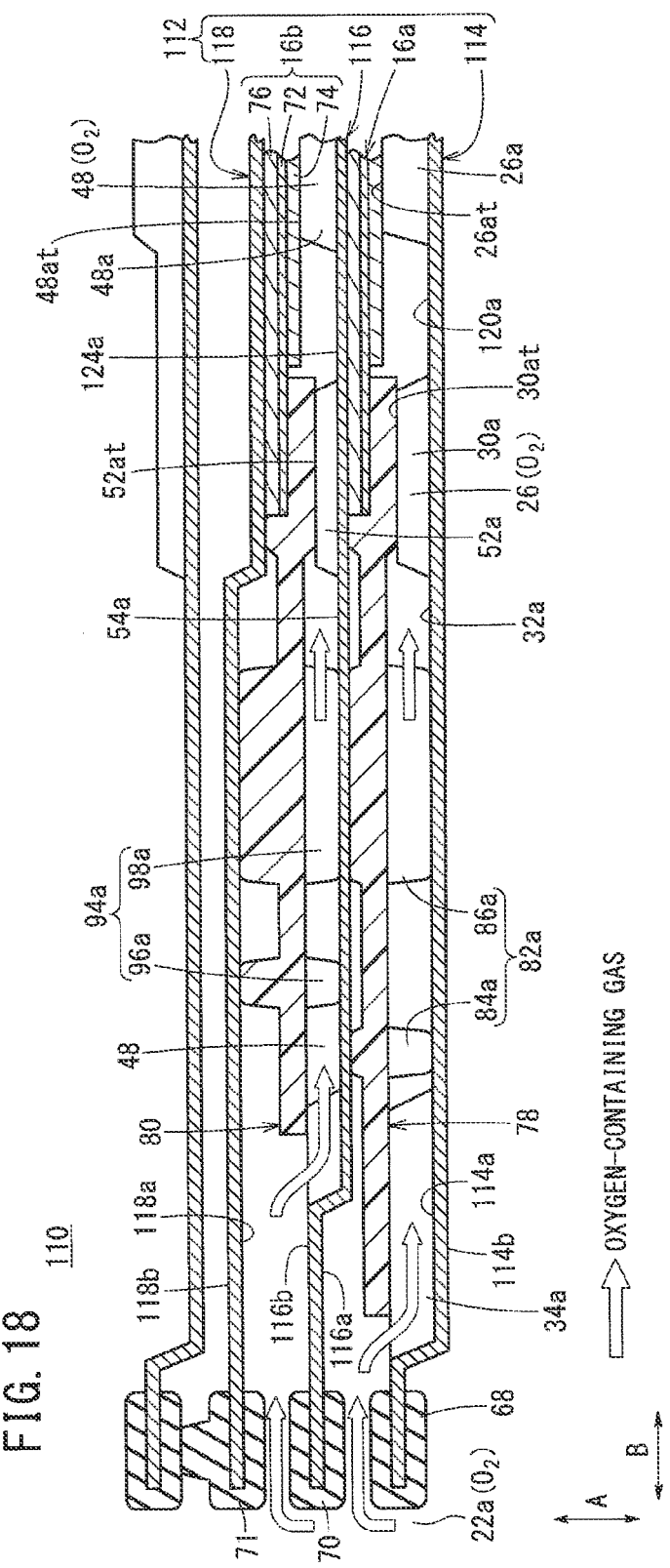
FIG. 18 is a cross sectional view showing the power generation unit, taken along a line XVIII-XVIII in FIG. 15.
Figure 19:
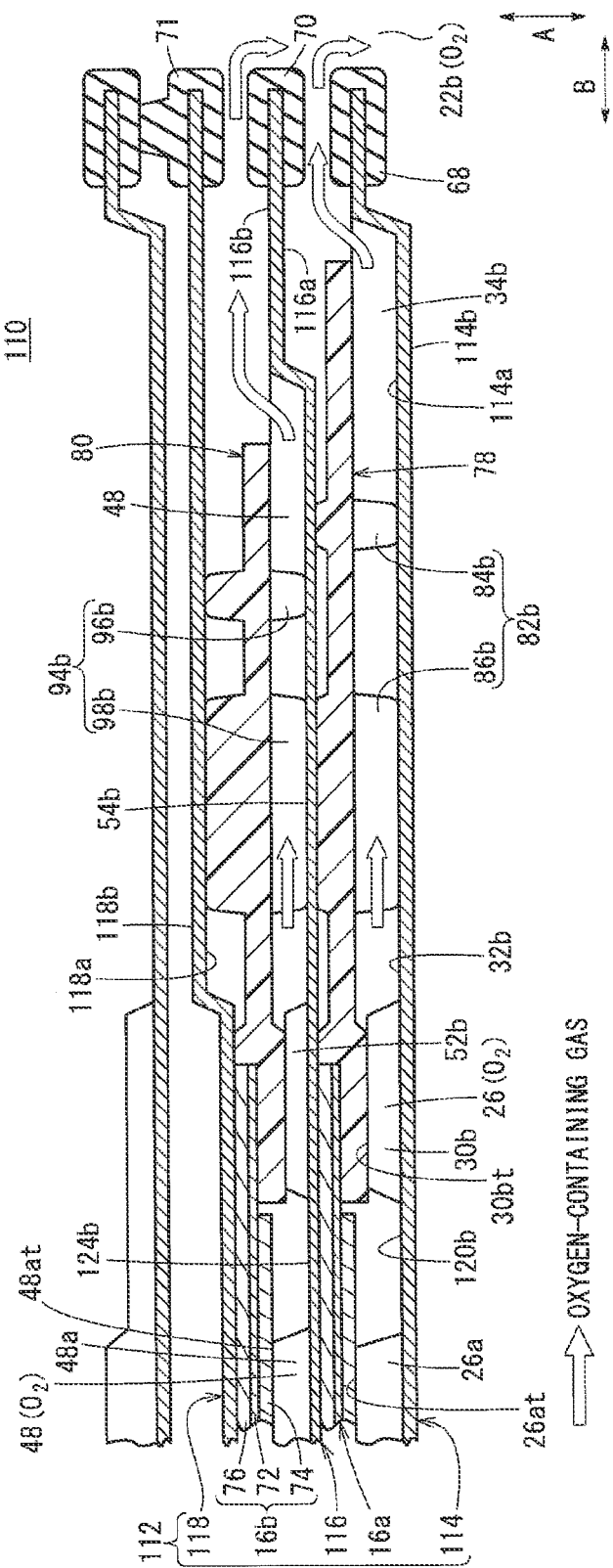
FIG. 19 is a cross sectional view showing the power generation unit, taken along a line XIX-XIX in FIG. 15.

As shown in FIGS. 18 and 21, on the surface 114a, the inlet merging area 120a is configured to allow merging of flows in the flow field width direction by reducing the height of the upper portions of ridges 26at formed between the wavy flow grooves 26a. As shown in FIG. 19, on the surface 114a, the outlet merging area 120b is configured to allow merging of flows in the flow field width direction by reducing the height of the upper portions of ridges 26at formed between the wavy flow grooves 26a.

As shown in FIG. 21, the inlet merging area 120a is formed between the ridges 26at forming the wavy flow grooves 26a and the ridges 30at forming the connection flow grooves 30a. The height of the inlet merging area 120a is smaller than the heights of the ridges 26at, 30at. The wavy flow grooves 26a and the connection flow grooves 30a are arranged in a zigzag pattern on both sides of the inlet merging area 120a. The inlet merging area 120a extends in a direction (indicated by an arrow C) intersecting with the flow direction of the oxygen-containing gas. The outlet merging area 120b has the same structure as the inlet merging area 120a described above.

Figure 15:
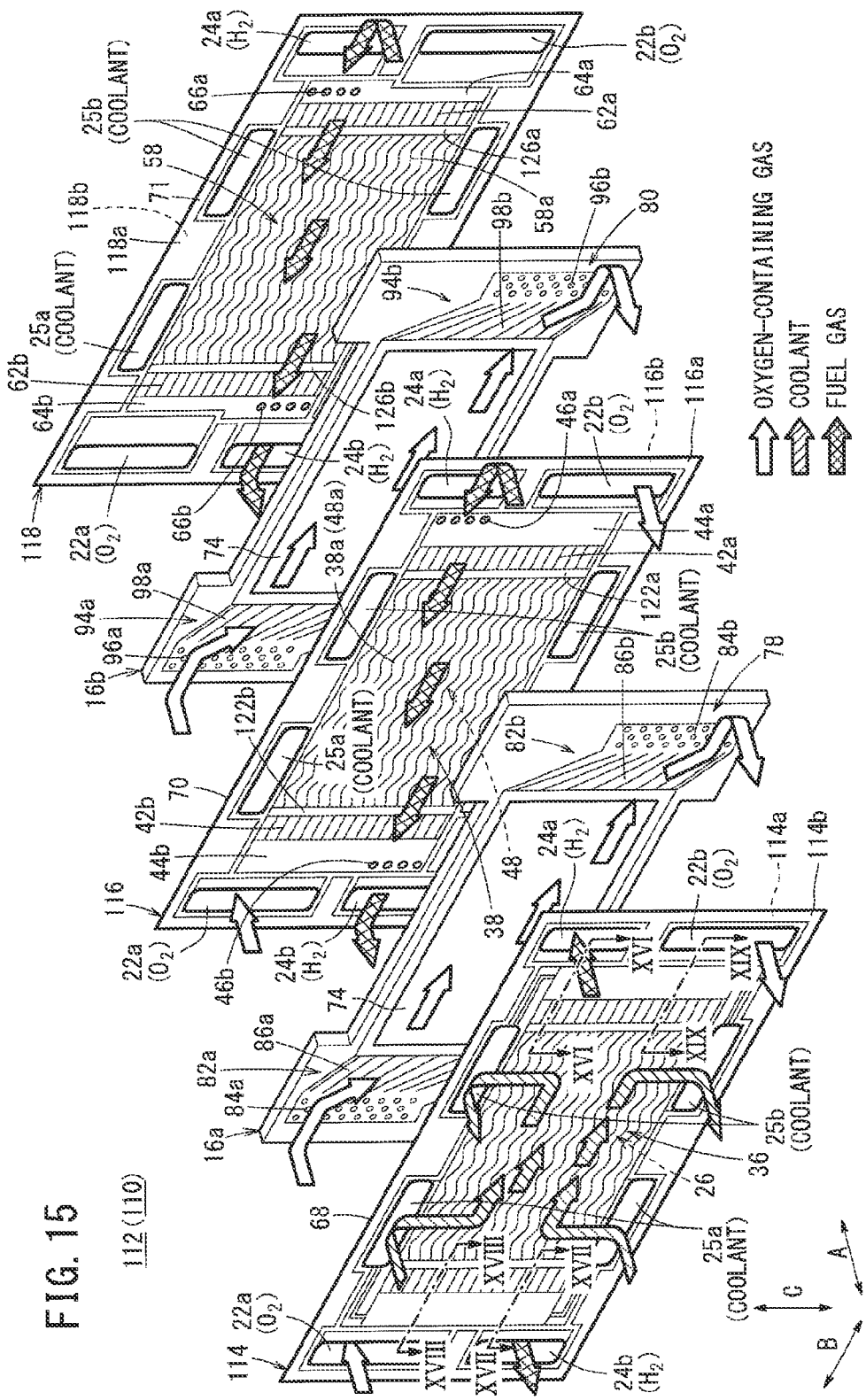
FIG. 15 is an exploded perspective view showing main components of a power generation unit of a fuel cell according to a third embodiment of the present invention.
Figure 16:
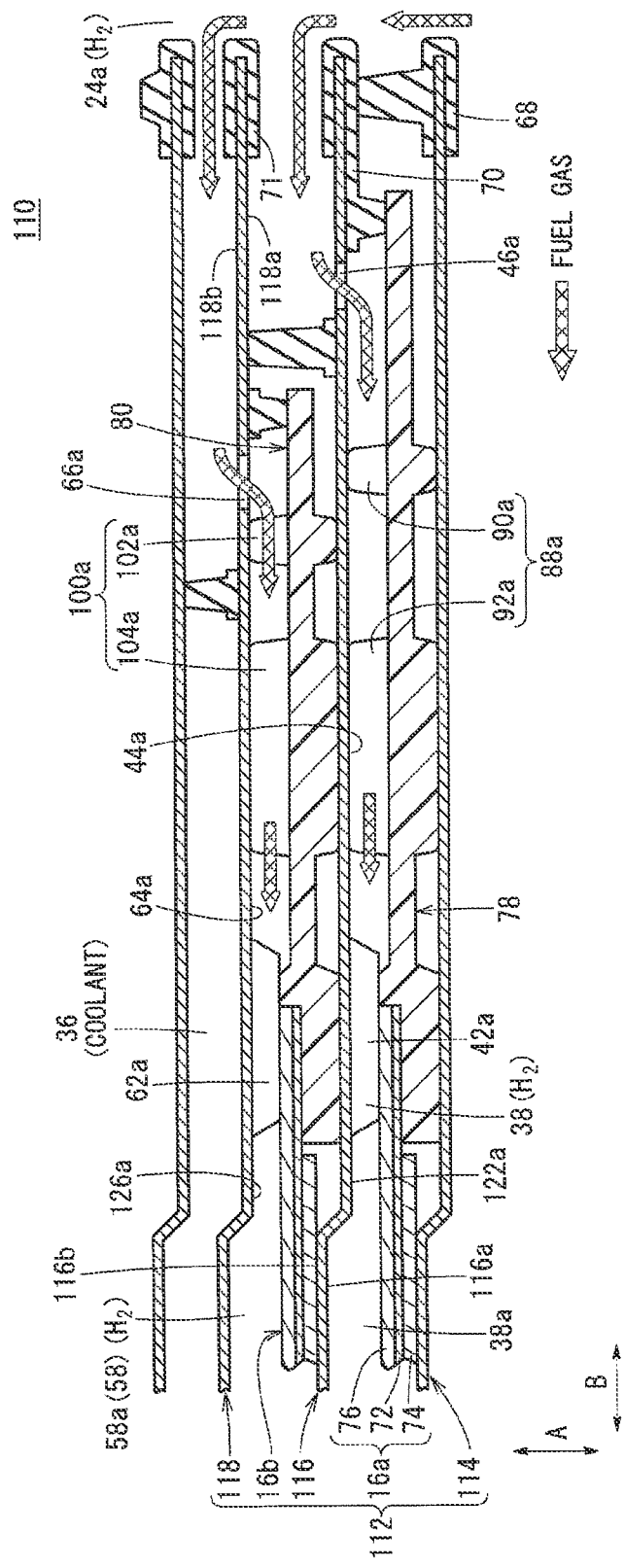
FIG. 16 is a cross sectional view showing the power generation unit, taken along a line XVI-XVI in FIG. 15.
Figure 17:
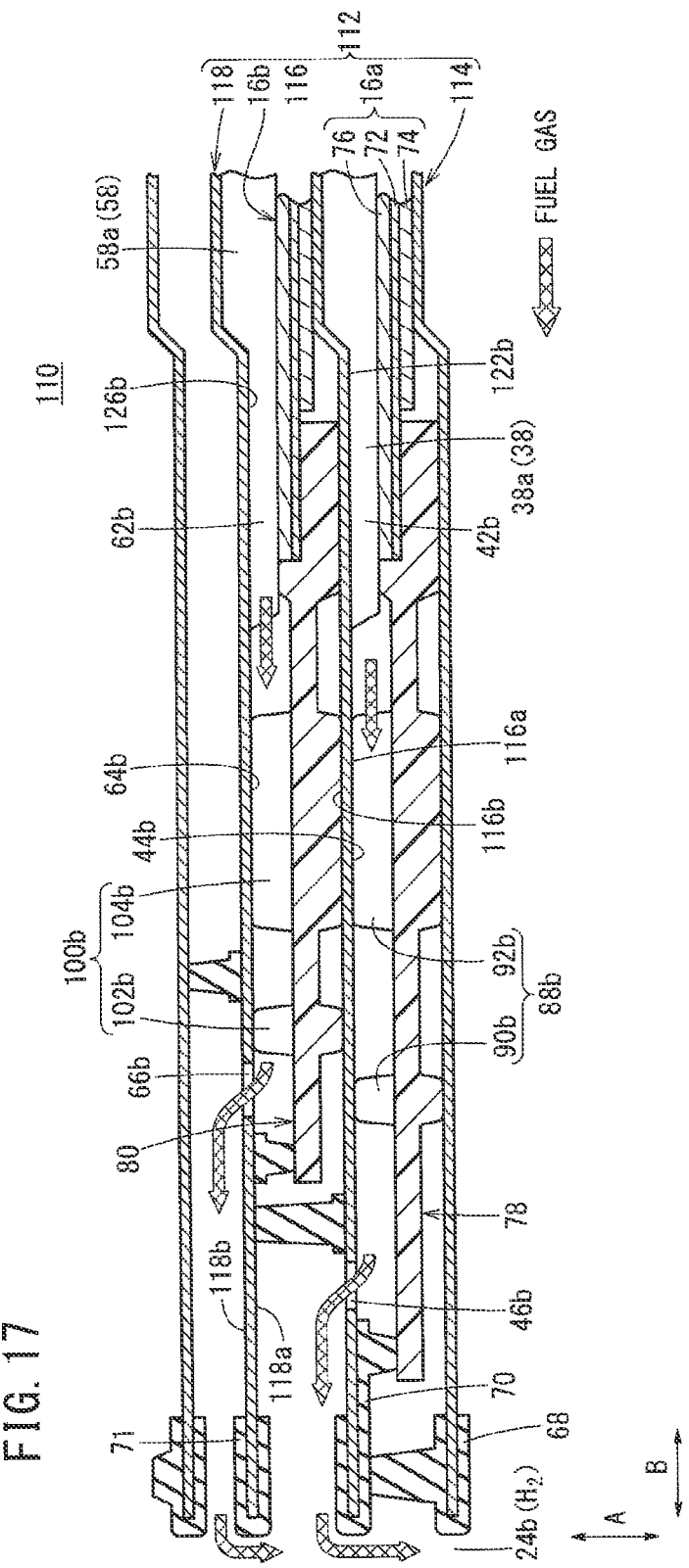
FIG. 17 is a cross sectional view showing the power generation unit, taken along a line XVII-XVII in FIG. 15.

As shown in FIG. 15, the second metal separator 116 has a first fuel gas flow field 38 on its surface 116a facing the first membrane electrode assembly 16a. The first fuel gas flow field 38 is connected to the fuel gas supply passage 24a and the fuel gas discharge passage 24b. An inlet merging area 122a is provided at the end of the first fuel gas flow field 38 on the inlet side, and an outlet merging area 122b is provided at the end of the first fuel gas flow field 38 on the outlet side. The inlet merging area 122a and the outlet merging area 122b have flat surfaces.

As shown in FIGS. 15 and 22, the second metal separator 116 has a second oxygen-containing gas flow field 48 on its surface 116b facing the second membrane electrode assembly 16b. The second oxygen-containing gas flow field 48 is connected to the oxygen-containing gas supply passage 22a and the oxygen-containing gas discharge passage 22b. An inlet merging area 124a is provided at the end of the second oxygen-containing gas flow field 48 on the inlet side, and an outlet merging area 124b is provided at the end of the second oxygen-containing gas flow field 48 on the outlet side. The inlet merging area 124a and the outlet merging area 124b have flat surfaces, and formed on the back surfaces of the outlet merging area 122b and the inlet merging area 122a on the surface 116a.

As shown in FIG. 15, the third metal separator 118 has a second fuel gas flow field 58 on its surface 118a facing the second membrane electrode assembly 16b. The second fuel gas flow field 58 is connected to the fuel gas supply passage 24a and the fuel gas discharge passage 24b. An inlet merging area 126a is provided at the end of the second fuel gas flow field 58 on the inlet side, and an outlet merging area 126b is provided at the end of the second fuel gas flow field 58 on the outlet side. The inlet merging area 126a and the outlet merging area 126b have flat surfaces.

In the third embodiment, as shown in FIG. 19, the outlet merging area 120b having the flat surface is provided at the end of the first oxygen-containing gas flow field 26 on the outlet side. The outlet merging area 120b is connected to a plurality of connection flow grooves 30b on a side opposite to the wavy flow grooves 26a. The groove depth of the connection flow grooves 30b is smaller than the groove depth of the wavy flow grooves 26a. Each of the connection flow grooves 30b has a straight pattern. That is, the outlet merging area 120b is provided in an area where the groove depth (flow field height) is decreased from the wavy flow grooves 26a to the connection flow grooves 30b.

Further, an outlet merging area 124b having a flat surface is provided at the end of the second oxygen-containing gas flow field 48 on the outlet side. The outlet merging area 124b is connected to a plurality of connection flow grooves 52b on a side opposite to the wavy flow grooves 48a. The groove depth of the connection flow grooves 52b is smaller than the groove depth of the wavy flow grooves 48a. Each of the connection flow grooves 52b has a straight pattern. That is, the outlet merging area 124b is provided in an area where the groove depth (flow field height) is decreased from the wavy flow grooves 48a to the connection flow grooves 52b.

In the structure, flows of the oxygen-containing gas from the wavy flow grooves 26a are temporarily merged in the outlet merging area 120b, and then, the oxygen-containing gas is distributed to the connection flow grooves 30b. Likewise, flows of the oxygen-containing gas from the wavy flow grooves 48a are temporarily merged in the outlet merging area 124b, and then, the oxygen-containing gas is distributed to the connection flow grooves 52b. Accordingly, improvement in the flowability of the oxygen-containing gas is achieved.

Thus, with simple and economical structure, the same advantages as in the cases of the first and second embodiments are obtained. For example, improvement in the performance of distributing the oxygen-containing gas is achieved. Moreover, improvement in the performance of discharging the water produced in the power generation is achieved suitably. It becomes possible to maintain the desired power generation performance. Likewise, also in the inlet merging areas 120a, 124a, the same advantages are obtained. For example, improvement in the flowability of the oxygen-containing gas is obtained.

Further, as components for the fuel gas, outlet merging areas 122b, 126b, and inlet merging areas 122a, 126a are provided. Thus, the same advantages as with the components for the oxygen-containing gas are obtained.

In the first to third embodiments, each of the power generation units 12, 12A, 112 of the fuel cell stacks 10, 10A, 110 adopts, so called skip cooling structure where three separators and two MEAs are provided. However, the present invention is not limited in this respect. For example, the present invention may use a fuel cell having cooling structure for each cell where one MEA is sandwiched between two separators, and a coolant flow field is provided for each cell. Further, in the illustrated embodiments, though the flow grooves of the buffers are provided in the resin frame member, instead of adopting this structure, the flow grooves of the buffers may be provided in flat areas at both ends of the gas flow field in the separator.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell formed by stacking a membrane electrode assembly and separators together in a stacking direction, the membrane electrode assembly including a pair of electrodes and an electrolyte membrane between the electrodes, a first reactant gas flow field being formed in the separator facing one of the electrodes and configured to supply one of reactant gases along an electrode surface, a second reactant gas flow field being formed in the separator facing another of the electrodes and configured to supply another of reactant gases along an electrode surface, wherein at least the first reactant gas flow field includes:
a plurality of flow grooves formed between a plurality of ridges extending along a power generation area in parallel to one another;
a merging area configured to allow merging of flows in the plurality of flow grooves in a flow field width direction by reducing a height of the ridges at a flow field end; and
a plurality of connection flow grooves, the merging area having one end connected to the flow grooves, the connection flow grooves being connected to another end of the merging area opposite to the one end of the merging area, a groove depth of the connection flow grooves being smaller than a groove depth of the flow grooves.

2. The fuel cell according to claim 1, wherein a resin frame member is provided at an outer end of the membrane electrode assembly, and the merging area is provided adjacent to an inner side of the resin frame member.

3. The fuel cell according to claim 2, wherein the connection flow grooves are provided at positions facing the resin frame member in the stacking direction.

4. The fuel cell according to claim 1, wherein the flow grooves extend in a wavy pattern along the electrode surface, and the connection flow grooves extend in a straight pattern.

* * * * *